US007293205B2

(12) United States Patent
Tsunekazu et al.

(10) Patent No.: US 7,293,205 B2
(45) Date of Patent: Nov. 6, 2007

(54) ELECTRONIC CONTROL UNIT

(75) Inventors: Shoso Tsunekazu, Tokyo (JP); Kohji Hashimoto, Tokyo (JP); Yuki Iwagami, Tokyo (JP); Akihiro Ishii, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 472 days.

(21) Appl. No.: 11/033,906

(22) Filed: Jan. 13, 2005

(65) Prior Publication Data

US 2005/0276114 A1  Dec. 15, 2005

(30) Foreign Application Priority Data

Jun. 11, 2004  (JP)  ............... 2004-173964

(51) Int. Cl.
  *G05B 21/02*  (2006.01)
  *G06K 5/04*  (2006.01)
(52) U.S. Cl. ......................... 714/699; 700/73
(58) Field of Classification Search ............... None
  See application file for complete search history.

(56) References Cited

U.S. PATENT DOCUMENTS

| 5,812,428 | A  | * | 9/1998  | Zou et al. ............... 700/34 |
| 6,463,339 | B1 | * | 10/2002 | Vasko .................... 700/18 |
| 6,795,767 | B2 |   | 9/2004  | Nakamoto et al.     |
| 7,191,087 | B2 | * | 3/2007  | Inoue et al. ............ 702/127 |

FOREIGN PATENT DOCUMENTS

| JP | 57036350    | A | * | 2/1982  |
| JP | 04373059    | A | * | 12/1992 |
| JP | 7-269409    | A |   | 10/1995 |
| JP | 9-53504     | A |   | 2/1997  |
| JP | 9-162814    | A |   | 6/1997  |
| JP | 2002-333901 | A |   | 11/2002 |

OTHER PUBLICATIONS

"On the design of electronic automotive engine controls using linear quadratic control theory" Cassidy et al. IEEE Transactions on Automatic Control, Publication Date: Oct. 1980 vol. 25, Issue: 5 pp. 901-912 ISSN: 0018-9286.*

* cited by examiner

*Primary Examiner*—Cynthia Britt
(74) *Attorney, Agent, or Firm*—Sughrue Mion, PLLC

(57) ABSTRACT

In an electronic control unit, a control constant stored in a program memory is transmitted to a data memory via a serial communication circuit. First control circuit section (master station) and second control circuit section (substation) mutually communicate through series-parallel converters. The master station includes regular transmission device and storage constant confirmation processing device. The substation includes regular report device and confirmation reply device to a data transmitted from the master station. A constant set data transmitted from the master station by regular transmission device is stored in the data memory at the time of normal receiving. Confirmation information such as sum value of the entire data in the data memory is reported by regular report device. At the master station, if there is any error in the confirmation information, a constant set data is retransmitted with regular transmission device. Reliability of data in the data memory is improved.

15 Claims, 14 Drawing Sheets

204 e : RETRANSMISSION REQUEST
206 e : READOUT REQUEST

IRREGULAR TRANSMISSION PACKET (READOUT REQUEST)

| | |
|---|---|
| STX · 55H | FRAME 1 |
| COMMAND · 30H | FRAME 2 |
| ADDRESS | FRAME 3 |
| ETX · AAH | FRAME 4 |
| CHECKSUM | FRAME 5 |

204a

REPORT REPLY PACKET
NORMAL RECEIVING

| | |
|---|---|
| STX · 25H | FRAME 1 |
| READOUT DATA 1 | FRAME 2 |
| READOUT DATA 2 | FRAME 3 |
| ADDRESS | FRAME 4 |
| ETX · AAH | FRAME 5 |
| CHECKSUM | FRAME 6 |

204c

CONFIRMATION REPLY PACKET
RECEIVING FAILURE

| | |
|---|---|
| STX · 55H | |
| NACK · 72H | |
| ADDRESS | |
| ETX · AAH | |
| CHECKSUM | |

214c

REGULAR TRANSMISSION PACKET (OUTPUT SETTING)

| | |
|---|---|
| STX · 55H | FRAME 1 |
| COMMAND · 10H | FRAME 2 |
| WRITE DATA | FRAME 3 |
| ADDRESS | FRAME 4 |
| ETX · AAH | FRAME 5 |
| CHECKSUM | FRAME 6 |

201a

CONFIRMATION REPLY PACKET
NORMAL RECEIVING

| | |
|---|---|
| STX · 55H | FRAME 1 |
| ACK · 61H | FRAME 2 |
| ADDRESS | FRAME 3 |
| ETX · AAH | FRAME 4 |
| CHECKSUM | FRAME 5 |

201c

RECEIVING FAILURE

| | |
|---|---|
| STX · 55H | |
| NACK · 62H | |
| ADDRESS | |
| ETX · AAH | |
| CHECKSUM | |

211c

REGULAR TRANSMISSION PACKET (REPORT PERMISSION)

| | |
|---|---|
| STX · 55H | FRAME 1 |
| COMMAND · 10H | FRAME 2 |
| COMMAND DATA · 01H | FRAME 3 |
| SPECIFIED ADDRESS · #00 | FRAME 4 |
| ETX · AAH | FRAME 5 |
| CHECKSUM | FRAME 6 |

211a

REGULAR REPORT PACKET (INPUT READOUT)
NORMAL RECEIVING

| | |
|---|---|
| STX · 11H | FRAME 1 |
| REPORT DATA 1 | FRAME 2 |
| REPORT DATA 2 | FRAME 3 |
| STATUS | FRAME 4 |
| ADDRESS | FRAME 5 |
| ETX · AAH | FRAME 6 |
| CHECKSUM | FRAME 7 |

206a

CONFIRMATION REPLY PACKET
RECEIVING FAILURE

| | |
|---|---|
| STX · 55H | |
| NACK · 62H | |
| SPECIFIED ADDRESS · #00 | |
| ETX · AAH | |
| CHECKSUM | |

221c

216a

| | |
|---|---|
| STX · 11H | FRAME 1 |
| SUM VALUE | FRAME 2 |
| REMAINDER VALUE | FRAME 3 |
| STATUS | FRAME 4 |
| ADDRESS #AB | FRAME 5 |
| ETX · AAH | FRAME 6 |
| CHECKSUM | FRAME 7 |

Fig. 10

ELECTRONIC CONTROL UNIT

BACKGROUND OF THE INVENTION

1. Field of the Invention

The present invention relates to an electronic control unit containing therein a microprocessor for use in, e.g., fuel supply control of an automobile engine and, more particularly, to an on-vehicle electronic control unit improved in reliability of a control constant to be transmitted from a non-volatile program memory that is provided in a first control circuit section acting as a master station to a data memory that is provided in a second control circuit section acting as a substation in an electronic control unit including a plurality of control circuit sections electrically divided so as to exchange serial signals with each other.

2. Description of the Related Art

An electronic control unit arranged to exchange information by the method of serial communication between a plurality of control circuit sections sharing functions therebetween, as well as to detect communication error and perform error processing has been popularly put in practical use.

For example, the "On-Vehicle Electronic Control Unit" of the Japanese Patent Publication (unexamined) No. 333901/2002, discloses an on-vehicle electronic control unit provided with serial communication means that is formed of an integrated circuit section mutually communicating with a microprocessor and that is capable of transferring control constants at the start of operation or of mutually exchanging various data during the operation freely. In this prior art, specific constitution examples of a variety of communication packets are described in detail including retransmission processing in case of sum-check error or timeout check error with respect to a serial communication data.

Further, the "On-Vehicle Electronic Control Unit" of the Japanese Patent No. 3346163 discloses a technique, in which a ROM data, which is provided in the first microcomputer with regard to a control content of the second microcomputer, is repeatedly transmitted at intervals of a predetermined period; and a RAM data in the second microcomputer is updated with the mentioned transmitted data, thereby enabling an immediate recovery even if the RAM data is destroyed.

On the other hand, the "On-Vehicle Electronic Control Unit" of the Japanese Patent No. 3156493 discloses a technique, in which at the transmission side CPU, a SUM value of the entire transmission data is calculated, and the transmission processing is carried out with a value identical to the foregoing SUM value added to the tail end of a transmission data row; and at the receiving side CPU, a SUM value from the head to the last but one of a received data is calculated, and this SUM value and the rearmost data of the received data are compared. Further, in the case of being the same as a result of comparison, a received data is employed. In the case of being different as a result of comparison, a normal data having been received last time is employed.

In addition, the "Communication Monitoring System" of the Japanese Patent Publication (unexamined) No. 162814/1997 discloses a communication monitoring system, in which a subtracter is provided for doing a countdown at the time of normal communication relative to an error counter that performs a count-up every time any communication error occurs; and the communication error is announced when a count value of the error counter reaches a predetermined value, thereby enabling communication monitoring that is not sensitive to sporadic communication error but immediately announces a continuous communication error.

In the above-mentioned on-vehicle electronic control unit disclosed in the Japanese Patent Publication (unexamined) No. 333901/2002, a normal data is obtained by sum-check of communication data and retransmission processing for error occurrence, at the time of transmitting and receiving control constants. A problem exists in that the presence or absence of data destruction can be detected only by individually reading out and checking control constants once a number of control constants have sequentially been received and stored in the constant setting register.

Moreover, any spontaneous upstream communication packet from the substation side (integrated circuit side) to the master station side (microprocessor side) is not prepared, and reporting from the substation side cannot be carried out without the request from the master station side. Thus, regular requests become necessary in the case where there are regular report data, resulting in a problem that a useless downstream communication takes place.

In the above-mentioned on-vehicle electronic control unit disclosed in the Japanese Patent No. 3346163, a problem exists in the jam-up occurrence of downstream communication due to the fact control constants are transmitted on a regular basis during the operation in the case where there are a number of control constants having to be transmitted to the substation.

Even in the case where control constants are transmitted only at the start of operation and retransmitted during the operation only when a RAM data on the substation side and a ROM data on the master station side is in no coincidence as a result of comparison, a problem exists in that upstream communication is jammed up resulted from the transmission of comparison data to the master station in the case of carrying out the comparison on the master station side; and downstream communication for retransmitting a comparison data is jammed up in the case of carrying out the comparison on the substation side.

In the above-mentioned on-vehicle electronic control unit disclosed in the Japanese Patent No. 3156493, only normal data is obtained by performing the sum-check of a communication data at the time of transmitting and receiving a control constant. A problem exists in that the presence or absence of data destruction can be detected only by individually reading out and checking control constants once a number of control constants have sequentially been received and stored in the constant setting register.

Further, in the above-mentioned communication monitoring system disclosed in the Japanese Patent Publication (unexamined) No. 162814/1997, a problem exists in that a response delay takes place in detecting an error occurrence after the normal communication has continuously been carried out on condition that a threshold for communication error determination is set to be large. On the contrary, a problem exists in that too sensitive error detection is carried out also in the case of trifle and sporadic error occurrence on condition that a threshold for error determination is set to be small.

Moreover, responses to a variety of communication errors of various types, and processing in the case of timeout error or the retransmission processing are not comprehensively described.

SUMMARY OF THE INVENTION

The present invention was made to solve the above-described problems, and has an object of providing an electronic control unit, which includes first and second control circuit sections electrically divided so as to mutually exchange serial signals, the electronic control unit being capable of improving a quality of a control constant data transmitted from the first control circuit section acting as a master station to the second control circuit section acting as a substation, and of reducing a burden required for communication control of a microprocessor on the master station side.

An electronic control unit according to this invention includes: a first control circuit section that contains a program memory including input/output control means with respect to any external apparatus, a set data being a preliminarily set controlling constant, and communication control means; an operation processing RAM memory; a microprocessor cooperating with the mentioned program memory; and a first series-parallel converter. This electronic control unit includes also: a second control circuit section that contains a communication control circuit section for exchanging monitoring and control signals, a data memory, and a second series-parallel converter. In this electronic control unit, a serial communication of monitoring and controlling signals is carried out mutually between the mentioned first control circuit section and the second control circuit section via the mentioned first and second series-parallel converters. In this electronic control unit, the mentioned first control circuit section includes regular transmission means and storage constant confirmation processing means, and the mentioned second control circuit section includes regular report means.

The mentioned regular transmission means regularly transmits in sequence a control output data or a constant set data from the mentioned first control circuit section to the mentioned second control circuit section, and stores the mentioned control output data or constant set data having been received at the mentioned second control circuit section in the mentioned data memory.

The mentioned regular report means regularly reports confirmation information with regard to the whole or a part of constant set data that are stored in the mentioned data memory, from the mentioned second control circuit section to the mentioned first control circuit section.

The mentioned storage constant confirmation processing means compares reference information with regard to the whole or a part of the mentioned constant set data having preliminarily been set in the mentioned first control circuit section with confirmation information given by the mentioned regular report means, and retransmits a constant set data to the mentioned second control circuit section by the mentioned regular transmission means in the case of no coincidence as a result of comparison.

As a result of such arrangement of the electronic control unit according to the invention, even if a data memory in the second control circuit section is changed due to, e.g., influence of noise, it is possible to immediately detect the fact that the data memory in the second control circuit section is changed due to the influence of noise in spite of a small amount of communication data, and to replace the data memory with a correct constant set data.

Furthermore, when there are much downstream communication of various set information from the first control circuit section acting as the master station to the second control circuit section acting as the substation at the start of operation, it is possible to diminish communication control burden on the master station side by making the regular report unavailable.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 are communication packet diagrams of the electronic control unit according to the second embodiment.

FIG. 13 is a flowchart for explaining transmission operation of the second control circuit section of the electronic control unit according to the second embodiment.

DETAILED DESCRIPTION OF THE INVENTION

EMBODIMENT 1

Figure 1:
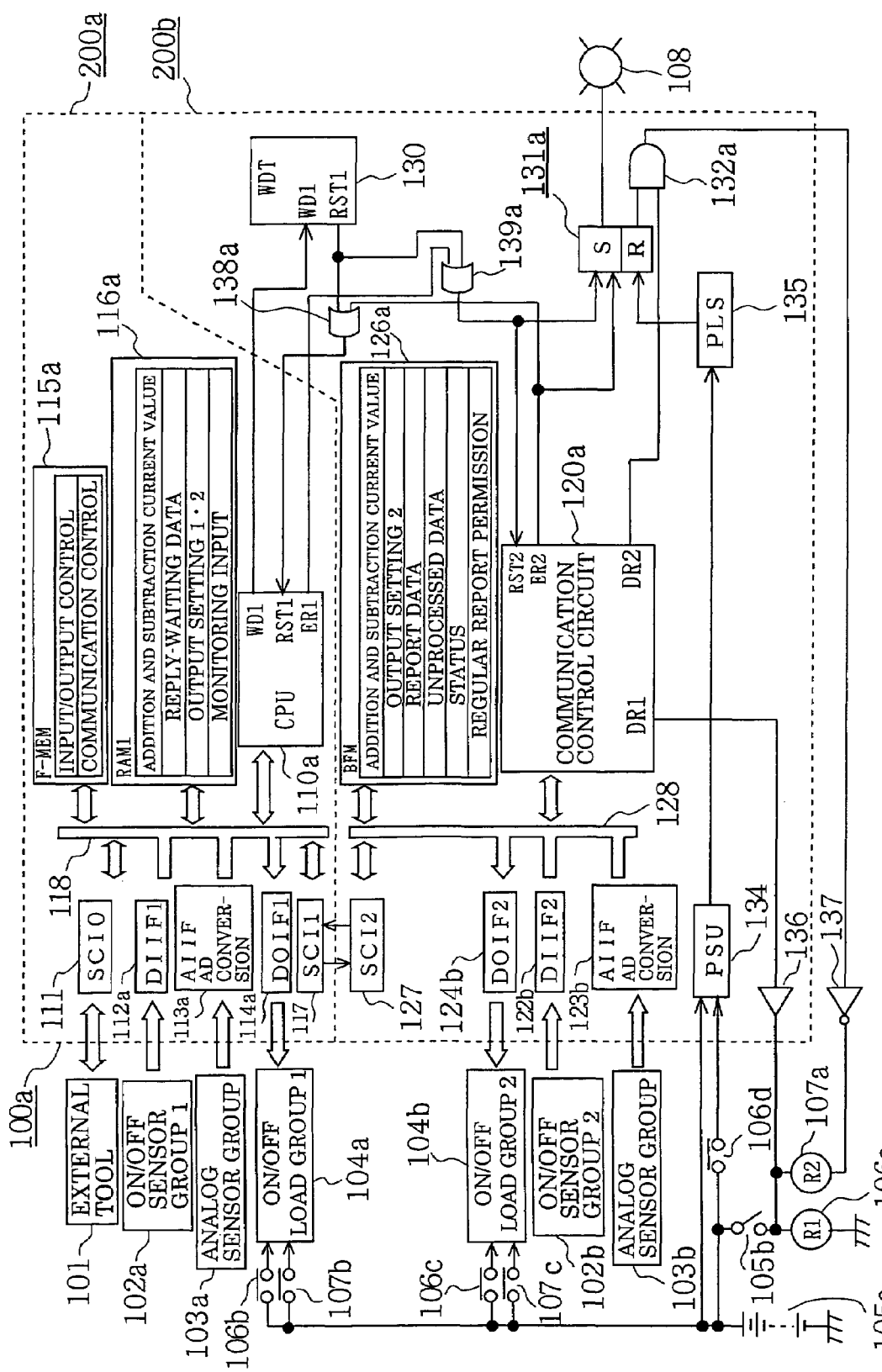
FIG. 1 is a block diagram showing an entire constitution of an electronic control unit according to a first preferred embodiment.

Hereinafter, referring to the drawings, a preferred embodiment according to the present invention is described.

In the drawings, like reference numerals indicate the same or like parts.

As shown in the drawings, an electronic control unit 100a according to a first embodiment consists of a first control circuit section 200a and a second control circuit section 200b.

First, external devices to be connected to the outside of the electronic control unit 100a are described.

An external tool 101 is connected via a detachable connector not shown, to the electronic control unit 100a at the time of product shipping or maintenance inspection, and functions to transfer and write a control program or a constant set data acting as a control constant in a later-described non-volatile program memory 115a.

A first input sensor group 102a serves as a sensor group, which performs an ON/OFF operation of relatively high speed and high frequency, and in which signals need to be directly fetched in the later-described main CPU 110a (it is merely referred to as microprocessor as well).

A second input sensor group 102b serves as a sensor group, which performs an ON/OFF operation of relative low frequency, and in which delay of fetching signals does not matter much.

A first analog sensor group 103a serves as a sensor group, and in which output change is relatively sharp and signals need to be directly fetched in the later-described main CPU 110a.

A second analog sensor group 103b serves as a sensor group, in which output change is relatively slow and delay of fetching signals does not matter much.

A first current consumer group 104a serves as a current consumer group, which performs an ON/OFF operation of relatively high frequency, and which needs to generate a drive output without delay.

A second current consumer 104b serves as a current consumer group, which performs an ON/OFF operation of relatively low frequency, and in which response delay of drive outputs does not matter much.

An external power supply 105a is a DC power supply for feeding an electric power to the electronic control unit 100a or the first and second current consumer groups 104a and 104b.

A power supply switch 105b is connected between a power supply relay 106a including output contacts 106b, 106c, 106d, a load power supply relay 107a including output contacts 107b and 107c, and the external power supply 105b. This power supply switch 105b closes a power supply circuit with respect to the first and second current consumer groups 104a and 104b through the output contacts 106b and 106c; and closes a power feed circuit from the external power supply 105a with respect to the electronic control unit 100a through the output contact 106d.

In addition, the external power supply 105a and the electronic control unit 100a are also provided with a direct connection circuit so that the electronic control unit 100a may be fed with an electric power in a sleep mode even when the power supply switch 105b is in an open circuit.

Further, a part of the first and second current consumer groups 104a and 104b are arranged so that a power supply circuit thereof may be closed through the output contacts 107b and 107c of the load power supply relay 107a.

An alarm and display 108 acting as annunciation means is driven from the electronic control unit 100a, and mounted in such a position that an observer can visually confirmed with ease.

Now, an internal constitution of the first control circuit section 200a is described.

A main CPU 11a is a microprocessor, for example, of 32 bits. A serial interface 111 is an interface circuit for tool that is serially connected to the external tool 101. A direct input signal interface 112a is an interface circuit that is connected in parallel to the first input sensor group 102a. A multi-channel AD converter 113a is an AD converter that is connected to the mentioned first analog sensor group 103a, and converts an analog signal voltage into a digital value. A direct output signal interface circuit 114a is an interface circuit that is connected in parallel to the first current consumer group 104a.

A program memory 115a is a non-volatile memory such as flash memory. A RAM memory 116a is an operation processing memory capable of freely reading and writing. A first series-parallel converter 117 is a series/parallel converter mutually exchanging serial signals with the later-described second series-parallel converter 127.

Further, the serial interface 111, the first series-parallel converter 117, the AD converter 113a, the direct input/output signal interfaces 112a and 114a, the program memory 115a, the RAM memory 116a and the main CPU 110a are mutually connected through a data bus 118. The one that is specified with an address bus or a chip select circuit, not shown, communicates with the mentioned CPU 110a.

Additionally, written in the program memory 115a are a program acting as input/output control means with respect to the external device, a first and second constant set data acting as a control constant, or a program acting as communication control means; and a first and second constant set data acting as a control constant to be used in the first and second control circuit sections 200a and 200b.

Further, transferred and written in the RAM memory 116a are a current value data of the later-described first adder-subtracter, an output set data with respect to the first and second current consumer groups 104a and 104b, or a later-described reply waiting command data or a monitoring input data such as indirect input information or status information having been reported from the second control circuit section 200b. The first and second constant set data that is stored in the mentioned program memory 115a is also transferred and written in the RAM memory 116a.

Now, an internal constitution of the second control circuit section 200b is described.

An associative control circuit section 120a is a control circuit section of which main part is a later-described communication control circuit section. An indirect input signal interface 122b is an interface circuit that is connected in parallel to the second input sensor group 102b. A multi-channel AD converter 123b is an AD converter that is connected to the second analog sensor group 103b, and converts an analog signal voltage into a digital value. An indirect output signal interface 124b is an interface circuit that is connected in parallel to the second current consumer group 104b. A data memory 126b is a memory that is connected to a later-described data bus 128 with a chip select signal, not shown, and is capable of reading and writing freely. A second series-parallel converter 127 is a series/parallel converter that is serially connected to the first series-parallel converter 117.

Further, the second series-parallel converter 127, the indirect input/output signal interfaces 122b and 124b, the AD converter 123b, the data memory 126a and the associative control circuit section 120a are mutually connected through the data bus 128.

Additionally, written in the data memory 126a are a current value data of the later-described second adder-subtracter, and an output set data to the second current consumer group 104b or a regular report permitting command data having been transferred from the main CPU 110a, or the later-described unprocessed command data; and a report data to be transmitted to the main CPU 110a, a status information, or a second constant set data having been transmitted from the program memory 115a via the RAM memory 11a.

A watchdog timer 130 monitors a watchdog clear signal WD1, being a pulse train, which the main CPU 110a generates, and generates a reset pulse signal RST1 when a pulse width of the foregoing watchdog clear signal WD1 exceeds a predetermined value to cause the main CPU 110a to restart.

Further, the main CPU 110a generates a later-described first error detection signal ER1.

Furthermore, the associative control circuit section 120a generates a later-described second error detection signal ER2, a drive output DR1 to the power supply relay 106a, or a drive output DR2 to the load power supply relay 107a.

An error storage circuit 131a is formed of a flip-flop circuit including a set input S and a reset input R. This error storage circuit 131a stores operation of the reset pulse signal RST1 or the first and second error detection signals ER1 and ER2 to drive the alarm and display 108.

Drive stop means 132a is a gate circuit formed of AND element. A power supply unit (PSUP) 134 is a voltage regulation circuit that is fed with an electric power directly from the external power supply 105a, or fed with power via the output contact 106d of the power supply relay 106a, and generates a stabilized control power supply output to be used within the electronic control unit 100a.

A power supply detection circuit 135 is a pulse generation circuit that detects that the power supply switch 105b is brought in a closed circuit state to reset and initialize the error storage circuit 131a.

A drive element 136 drives the power supply relay 106a with a drive output DR1, and continues to keep the operation of the power supply relay 106a until a drive output DR1 stops being outputted even if the power supply switch 105b is brought in an open circuit.

An inverting drive element 137 drives the load power supply relay 107a from the terminal of a drive output DR2 via drive stop means 132a. The foregoing load power supply relay operates when a drive output DR2 is generated and the error storage circuit 131a stores no error.

Further, it is arranged such that the load power supply relay 107a is de-energized when the power supply relay 106a is de-energized; while only the load power supply relay 107a is de-energized even if the power-supply relay 106a is energized, thereby enabling to stop the power feed with respect to a part of current consumers.

An OR element 138a takes a reset pulse signal RST1 and a second error detection signal ER2 as inputs thereto, and an OR output thereof is connected to a reset input terminal RST1 of the main CPU 110a.

An OR element 139a takes a reset pulse signal RST1 and a first error detection signal ER1 as inputs thereto, and an OR output thereof is connected to a reset input terminal RST2 of the associative control circuit section 120a and a set input terminal of the error storage circuit 131a.

Figure 2:
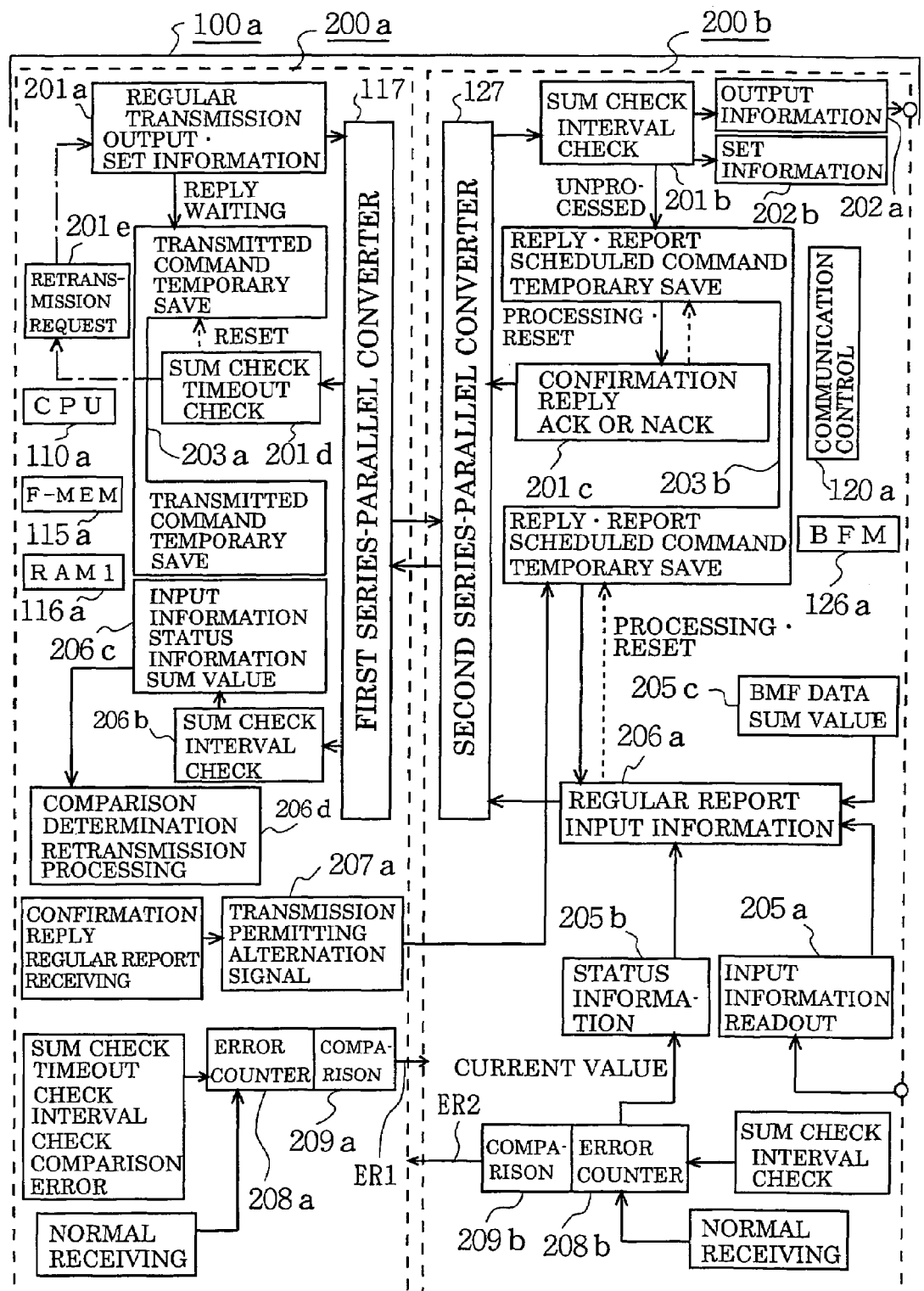
FIG. 2 is a communication control block diagram for explaining communication control operation of the electronic control unit according to the first embodiment.

FIG. 2 is a communication control block diagram for explaining a communication control operation of the electronic control unit according to the first embodiment shown in FIG. 1.

With reference to FIG. 2, signals to be exchanged between the first control circuit section 200a including the first series-parallel converter 117 (hereinafter, it is also referred to as a master station) and the second control circuit section 200b including the second series-parallel converter 127 (hereinafter, it is also referred to as a substation) are classified roughly as follows.

Block 201a is regular transmission mean in which signals are prepared at the master station and transmitted from the master station to the substation.

The signals generated by the foregoing regular transmission means are transmitted from the master station side at it's own initiative and almost regularly even if there is no request from the substation side. Further, an upper limit value of a time period interval thereof is managed so as to be not more than a predetermined value.

In addition, the data to be transmitted by the regular transmission means 201a includes, e.g., output information to be outputted to the second current consumer group 104b shown in FIG. 1, or the above-described second constant set data.

Block 201b is second communication error determination means in which communication error determination is made at the substation side having received a communication packet transmitted by the regular transmission means 201a. Block 202a and Block 202b are output information storage means and set information storage means that store in the mentioned data memory 126a a regular transmission data having been normally received via the foregoing determination means. Block 203b is an unprocessed data table that sequentially stores normal receiving ACK or receiving failure NACK as a reply command data responsive to the transmission from the master station to the substation. Block 201c is confirmation reply means in which confirmation is replied from the substation to the master station.

The mentioned confirmation reply means replies a communication packet corresponding to a leading reply command data having been stored at the earliest time and remaining in the unprocessed data table 203b. Further, a leading reply command data in the unprocessed data table 203b is deleted accompanied with the transmission of a communication packet performed by the confirmation reply means 201c.

Block 203a is a reply-waiting data table that sequentially stores a transmission command data when transmitting a communication packet with the regular transmission means 201a on the master station side. Block 201d is first communication error determination means in which communication error determination is made on the master station side having received a reply data from the substation. Block 201e is retransmission request means.

Further, a leading command data, which is stored in the reply-waiting data table 203a, is deleted when the determination means 201d makes a determination of normal receiving.

Furthermore, it is arranged such that when the determination means 201d normally receives the receiving failure data NACK on the substation side, or when the determination means 201d makes the determination of receiving error relative to a reply data, retransmission processing is carried out by the regular transmission means 201a based on the request from the retransmission request means 201e. Then, an old save data in the reply-waiting data table 203a is deleted responsive to the foregoing retransmission processing, and a transmission command data having been retransmitted is stored anew.

In addition, a reply command data to be processed responsive to the regular transmission means 201a and a regular report command data to be processed responsive to the later-described regular report means 206a are synthesized and stored in the unprocessed dada table 203b in order of generation. These data are replied sequentially in such a manner that the older ones are fetched out first on the basis of first-in first-out.

Block 206a is regular report means for regularly transmitting to the master station an input information 205a and a status information 205b on the substation side or, e.g., a confirmation information 205c being a binary addition value of the entire data that is stored in the data memory 126a.

The regular report made by the foregoing regular report means is transmitted at it's own initiative and almost regularly from the substation side even if there is no request from the master station side. Further, an upper limit value of a time period interval is managed so as to be not more than a predetermined value.

In addition, a content of the mentioned confirmation information 205c is a numerical value data for reference, e.g., a binary addition value with respect to the entire data of the second constant set data that is stored in the data memory 126a, or remainder value obtained by dividing this addition value by a predetermined constant value.

Block 206b is first communication error determination means in which communication error determination is made on the master station side having received a regular report data from the substation. Block 206c is storage means of an input information, status information and confirmation information, which stores the regular report data in the RAM memory 116a when the determination means 206b makes the determination of normal receiving. Block 206d is storage constant confirmation processing means that compares a confirmation information regarding the data memory 126a having been stored in Block 206c with a reference information having been preliminarily calculated in the first control circuit section 200a, and that transmits a constant set data again with the regular transmission means 201a in case of no coincidence as a result of comparison.

In addition, an input information 205a to be transmitted by the regular report means 206a includes indirect input signals generated by the second input sensor group 102b or the second analog sensor group 103b of FIG. 1.

Further, as a status information 205b, current value information at a later-described second adder-subtracter 208b is to be transmitted as indicating a state of the second control circuit section 200b.

Block 207a is transmission-permitting control signal generation means in which logic level inverts alternately every time the first control circuit section 200a receives either the confirmation reply or the regular report from the second control circuit section 200b. A leading command in the unprocessed data table 203b is transmitted in response to the foregoing transmission-permitting control signal.

First communication error determination means in the determination means 201d and 206b includes bit error determination means for determining the presence or absence of lack and mix of bit information such as parity check or sum check relative to a serial data having been replied or reported from the substation to the master station.

Further, the first communication error determination means at the determination means 201d includes reply response error determination means for making the error determination when a save time period of the oldest transmission command data remaining in the reply-waiting data table 203a exceeds a predetermined reply response time period.

Furthermore, the first communication error determination means in the determination means 206b includes receiving interval error determination means for making the error determination when a receiving interval time period of the master station with respect to a regular report data, which the substation transmits, exceeds a predetermined value.

Likewise, second communication error determination means at the determination means 201b includes bit error determination means for determining the presence or absence of lack and mix of bit information such as parity check or sum check with respect to a serial data having been transmitted from the master station to the substation.

Further, the second communication error determination means in the determination means 201b includes receiving interval error determination means that makes the error determination when a receiving interval time period of the substation relative to a regular transmission data, which the master station transmits, exceeds a predetermined value.

Block 208a is first adder-subtracter, which is formed of, for example, a reversible counter, and of which initial value is set to "9" and of which current value is limited so as not to be less than 0.

The foregoing adder-subtracter is arranged to operate and add a second variation value "3" when the error determination is made by the first communication error determination means 201d and 206b, or when the comparison error occurs in the storage constant confirmation processing means 206d, as well as to subtract a first variation value "1" when the determination means 201d and 206b make the normal determination.

Block 209a is first error occurrence definition means. This definition means is formed of a comparison circuit that generates a first error detection signal ER1 when a current value of the first adder-subtracter 208a exceeds "11".

Similarly, Block 208b is second adder-subtracter, which is formed of, for example, a reversible counter, and of which initial value is set to "9" and of which current value is limited so as not to be less than 0. The foregoing adder-subtracter is arranged to operate and add a second variation value "3" when the error determination is made by the second communication error determination means 201b, as well as to subtract a first variation value "1" when the determination means 201b makes the normal determination.

Block 209b is second error occurrence definition means. This definition means is formed of a comparison circuit that generates a second error detection signal ER2 when a current value of the second adder-subtracter 208b exceeds "11".

Figure 3:
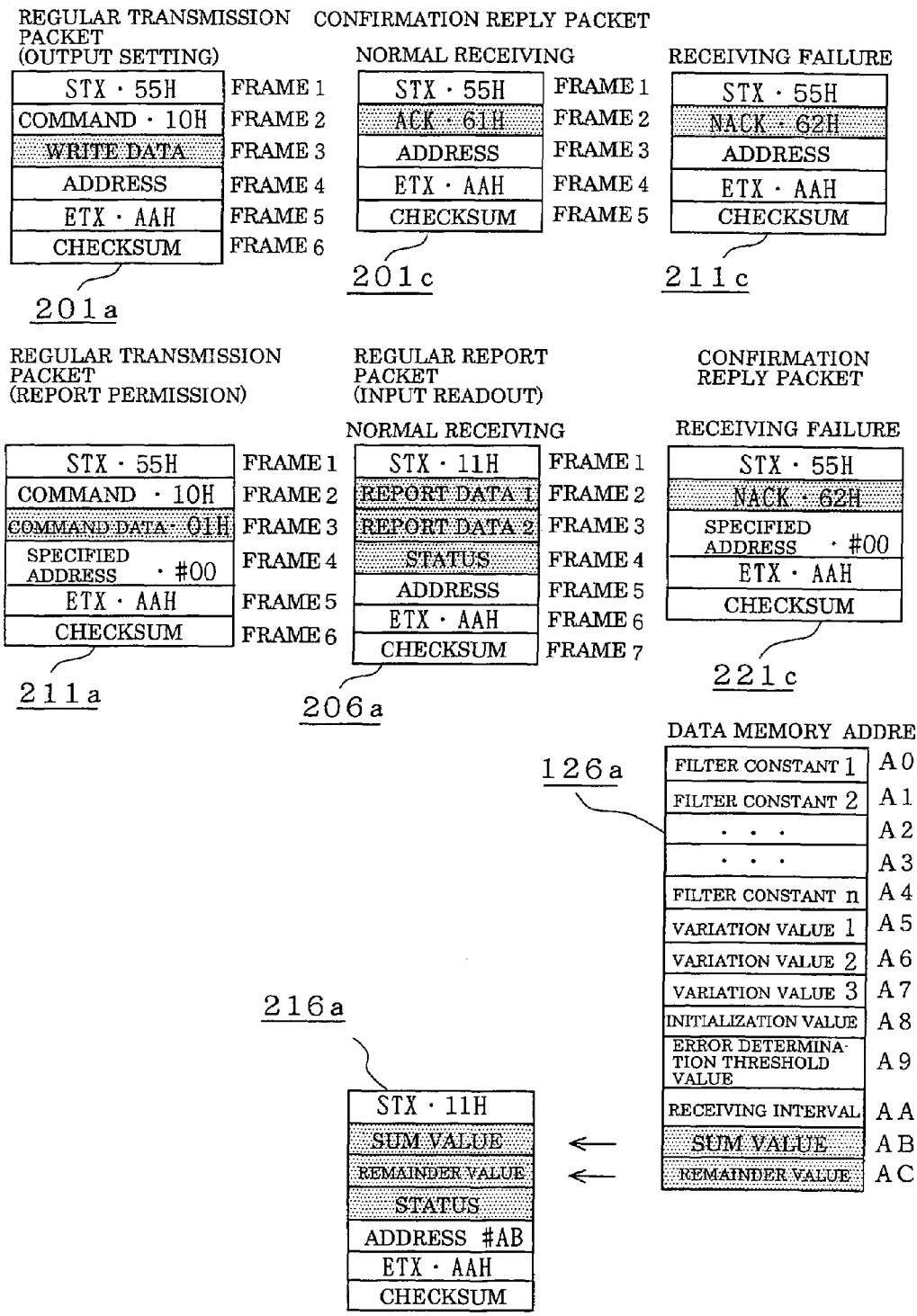
FIG. 3 are communication packet diagrams of the electronic control unit according to the first embodiment.

FIG. 3 are block diagrams respectively showing communication packets in the electronic control unit according to the first embodiment shown in FIG. 1.

With reference to FIG. 3, table 201a is a communication packet acting as regular transmission means from the master station to the substation. The foregoing regular transmission packet consists of frames 1 to 6, being a start data 55H, a command 10H, a write data, a storage location address, an end data AAH and a checksum data.

Further, the mentioned H shows that each numerical value is given in hexadecimal numerals.

Table 201c is a communication packet acting as confirmation reply means of the normal receiving (ACK) to be replied to the master station at the time of normal receiving. The foregoing confirmation reply packet consists of five frames of a start data 55H, an acknowledged data 61H, a storage location address, an end data AAH and a checksum data.

Table 211c is a communication packet acting as confirmation reply means of the receiving failure (NACK) to be replied to the master station at the time of abnormal receiving. The foregoing confirmation reply packet consists of five frames of a start data 55H, a non-acknowledged data 62H, a storage location address, and end data AAH and a checksum data.

Furthermore, an address of the confirmation reply packets 201c and 211c is the same as the address specified with a regular transmission packet 201a.

Table 211a is a regular transmission packet containing information of permitting the regular report. The foregoing regular transmission packet 211a consists of six frames of a start data 55H, a command 10H, a command data 01H, a specified address#00, an end data AAH and a checksum data. Further, the mentioned command data is a data that permits the regular report and specifies a report period.

Table 206*a* is a communication packet acting as the first regular report means to be relied to the master station at the time of normal receiving. The foregoing regular report packet consists of seven frames of a start data 11H, a report data 1, a report data 2, status information, an address, an end data AAH, and a checksum data.

Table 221*c* is a communication packet acting as confirmation reply means to be replied to the master station at the time of abnormal receiving. The foregoing confirmation reply packet consists of five frames of a start data 55H, a non-acknowledged data 62H, a specified address#00, an end data AAH and a checksum data.

In addition, once the regular transmission packet 211*a* has been received, the regular report packet 206*a* is transmitted repeatedly within a predetermined time period until receiving again a regular transmission packet 211*a* the command data of which is changed to 00H.

Further, a checksum data, which is shown in the final frame of each communication packet, is a binary addition value of each digit of the data from frame 1 to frame 5, or a complement value with respect to a binary addition value of all digits.

Accordingly, it is normal to obtain 0 by the binary addition of all data from frame 1 to frame 6. This confirmation operation is referred to as sum check operation.

An address of a report data to be specified with a regular report packet 206*a* is a sensor number of the second analog sensor group 103*b*, a group number of a unit of 16 points with respect to the second input sensor group 102*b*, or a storage address of confirmation information relative to the data memory 126*a*. The regular reporting is carried out while these addresses being sequentially updated.

Table 216*a* is a regular report packet in the case of being an address #AB in the case where confirmation information is stored as an address of a regular report packet 206*a*. Data to be reported herein is a sum value obtained by binary addition of the whole of the second constant set data in the data memory 126*a* and a remainder value obtained by dividing the foregoing sum value by a predetermined constant.

Additionally, constants of an input filter to be processed in the indirect input interface circuit 122*b*, or various set constants to be processed in the second adder-subtracter are stored in the data memory 126*a*. These constant set data are transmitted in sequence from the RAM memory 116*a* with the regular transmission packet 201*a*.

In this connection, addresses to be specified in the regular transmission packet 201*a* or the regular report packet 206*a* are updated every time each packet is transmitted. When a series of transmission completes, the addresses will be transmitted again in a cycle.

For example, on the supposition that there are addresses of three kinds of 1, 2, 3, the transmission is carried out in sequence of 1, 2, 3, 1, 2, 3, 1 . . . . However, not only such a simple cyclic way is employed, but also cyclic transmission depending on the degrees of priority is performed, and data of immediate importance is transmitted in as short period as possible.

For example, supposing that an address 1 is an urgent data among addresses 1, 2, 3, the order of transmission is e.g., 1, 2, 1, 3, 1, 2, 1, 3, . . . .

It is arranged, at the start of operation, such that constant set data to be stored in the data memory 126*a* are sequentially transmitted in priority; once the transmission of constant set data has completed, a priority is given to the transmission of control output data with respect to the second current consumer group 104*a*; and rewrite data with respect to various addresses of the data memory 126*a* are sequentially transmitted in lower priority while the transmission of the foregoing control output data being carried out.

Confirmation information such as a sum value or a remainder value is calculated again every time rewrite is performed with respect to the data memory 126*a*. In the case where a content of data is not changed, a result of re-calculation will be the same value as the last calculated value.

Figure 4:
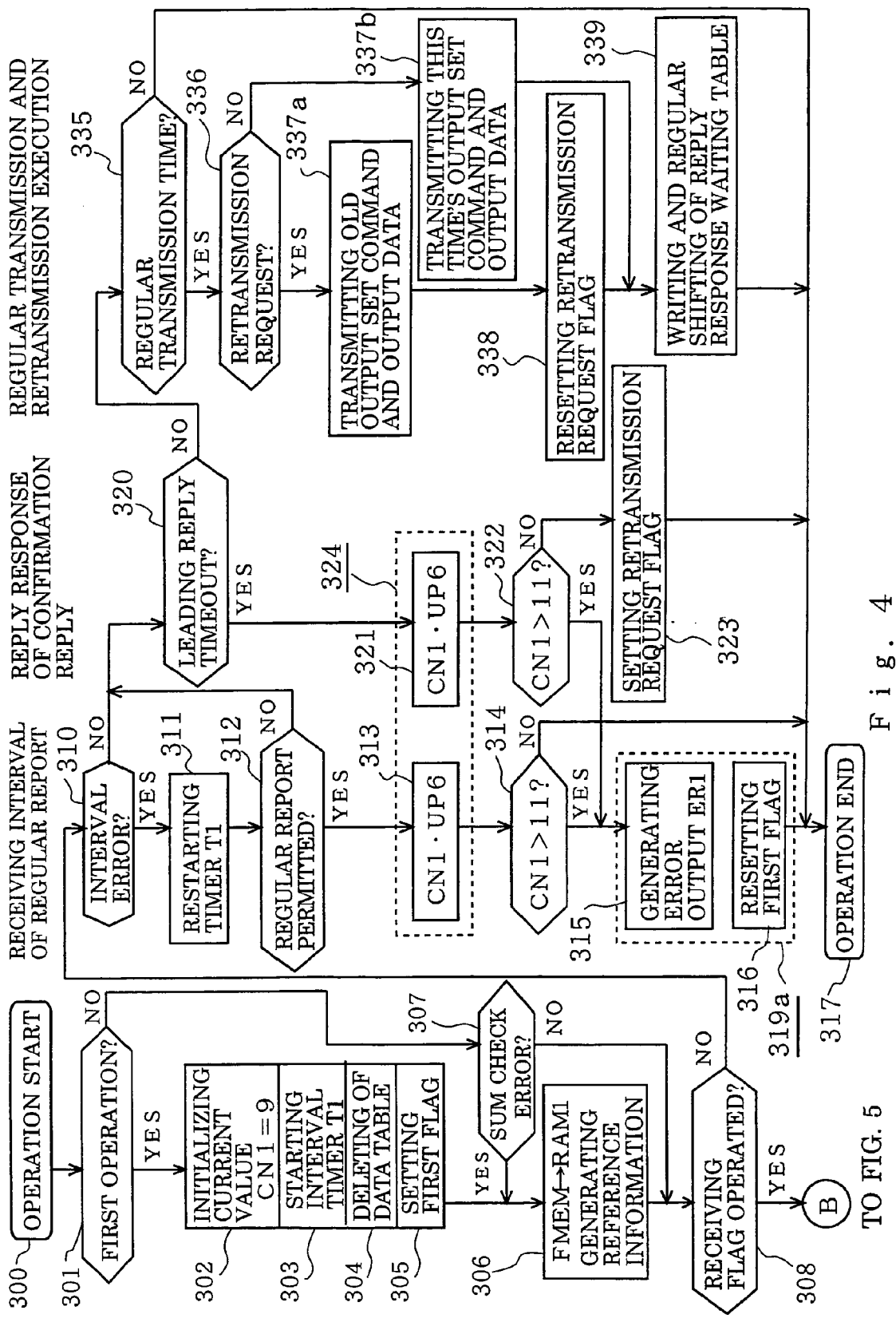
FIG. 4 is a flowchart for explaining transmission operation of the first control circuit section of the electronic control unit according to the first embodiment.
Figure 5:
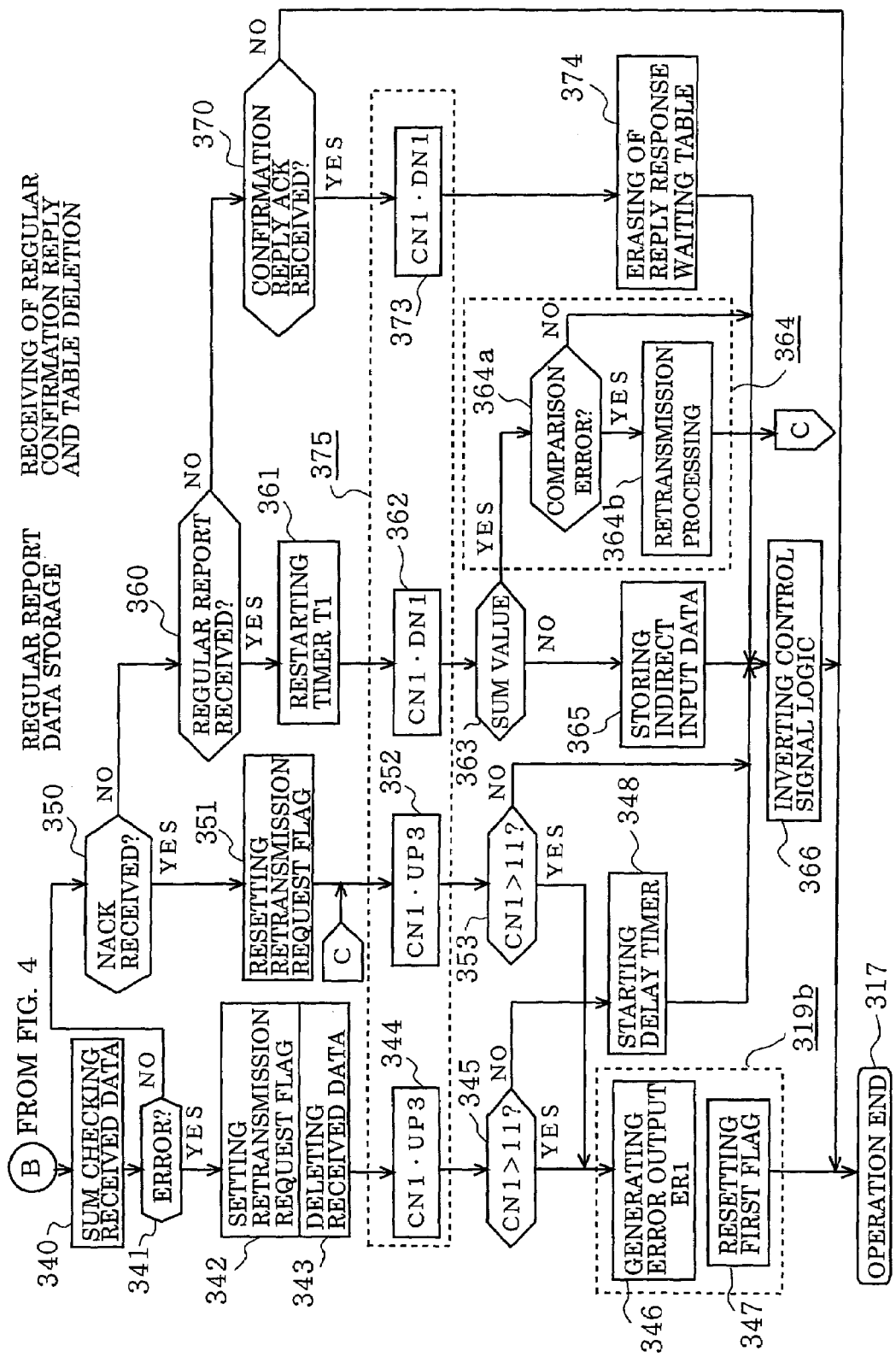
FIG. 5 is a flowchart for explaining receiving operation of the first control circuit section of the electronic control unit according to the first embodiment.

FIGS. 4 and 5 are flowcharts for explaining communication control operation in the first control circuit section of the electronic control unit according to this first embodiment.

FIG. 4 shows mainly a flow of transmission operation in the first control circuit section 200*a* and FIG. 5 shows mainly a flow of receiving operation in the first control circuit section 200*a*.

With reference to FIGS. 4 and 5, operations of the electronic control unit according to this first embodiment are described in detail.

Referring to FIG. 4, Step 300 is an operation start step of the main CPU 110*a* that is regularly activated. Step 300 is activated when the power supply switch 105*b* of FIG. 1 is turned on and when a reset pulse signal RST1 is supplied to the main CPU 110*a*; and operates in cycle subsequently to a later-described operation end step 317.

Step 301 is a step that acts subsequently to Step 300, and determines whether or not it is the first operation depending on whether or not the first flag is set in the later-described Step 305. Step 302 is a step that acts when the determination in Step 301 is YES (the first operation), and sets a current value of the first adder-subtracter 208*a* to an initial value "9". Step 303 is a step that acts subsequently to Step 302, and starts up an interval timer T1 of which interval value corresponds to an upper limit value of the regular report period. Step 304 designates a step that acts subsequently to Step 303, and deletes a content of the reply-waiting data table 203*a* of FIG. 2. Step 305 is a step that acts subsequently to Step 304, and sets a first flag not shown. The mentioned first flag is reset when the power supply switch 105*b* of FIG. 1 is turned on, and when a reset pulse signal RST1 is supplied to the main CPU 11*a*.

Step 306 is a step that acts subsequently to Step 305, and that transfers the first and second constant set data in the program memory 115*a* to the RAM memory 116*a*, and generates a reference information, e.g., a binary addition value with regard to the whole of the second constant set data to be transmitted to the data memory 126*a*, or a remainder value obtained by dividing this addition value by a predetermined constant. Step 307 is a step that acts when the determination in Step 301 is NO, that is, it is not the first operation, and carries out the sum-check of the entire constant set data that is stored in the RAM memory 116*a*. When Step 307 determines the presence of error, the program proceeds to Step 306.

Step 308 is a step acting when the determination in Step 307 is NO (there is no sum-check error) or subsequently to Step 306, and determining whether or not a receiving flag is operated indicating the fact that the first serial-parallel converter 117 receives a serial data having been transmitted from the second serial-parallel converter 127, and that the parallel conversion of a received data has completed. When the determination in Step 308 is YES (receiving completes), the program proceeds to Step 340 shown in FIG. 5.

Step 310 is a step that acts when the determination in Step 308 is NO (receiving flag has not operated yet), and determines whether or not the timer T1 having been started in Step 303 or later-described Step 311 or Step 361 (FIG. 5) is Time's Up. Step 311 is a step that acts when the determination in Step 310 is YES (Time's Up), and restarts the timer T1. Step 312 is a step that acts subsequently to Step 311, and determines whether or not the regular transmission has been permitted already by determining the operation state of a transmitting-permitted flag, not shown, that is set when the regular report permission is transmitted with a regular transmission packet 211a. Step 313 is a step that acts when the determination in Step 312 is YES, that is, when the regular report permission has been given already, and adds 6 counts to a value of operation means CN1 acting as first adder-subtracter.

Step 314 is a step that acts subsequently to Step 313, and determines whether or not a current value of the operation means CN1 acting as the first adder-subtracter exceeds 11. Step 315 is a step that acts when the determination in Step 314 is YES (in excess of 11), and generates a pulse output of the first error detection signal ER1. Step 316 is a step that acts subsequently to Step 315, and resets the first flag having been set in Step 305. Step 317 is an operation end step that acts when the determination in Step 314 is NO (not more than 11), or subsequently to Step 316. The operation start step 300 operates in cycle subsequently to Step 317.

In addition, Step Block 319a consists of Step 315 and Step 316, and acts as first initialization means.

Step 320 is a step that acts when the determination in Step 310 is NO (timer T1 is not Time's Up) or when the determination in Step 312 is NO, that is, when the regular report has not been permitted yet, and determines whether or not a save time period of a residual leading data of the reply-waiting data table (see Block 203a of FIG. 2) having been written in the later-described Step 339 exceeds a predetermined reply response time period T. Step 321 is a step that acts when the determination in Step 320 is YES (timeout), and adds 6 counts to a value of the operation means CN1 acting as the first adder-subtracter. Step 322 is a step that acts subsequently to Step 321, and determines whether or not a current value of the operation means CN1 acting as the first adder-subtracter exceeds 11. When the determination in Step 322 is YES (in excess of 11), the program proceeds to Step 315.

Step 323 is a step that acts when the determination in Step 322 is NO (not more than 11), and sets a retransmission request flag. The program proceeds to the operation end step 317 subsequently to Step 323.

Additionally, the reply-waiting data table 203a is formed of plural stages of shift register in which a stored data shifts every predetermined time period. In response to the fact that a reply-waiting command having been stored in the foregoing shift register shifts to an overflow register, the timeout determination is made in Step 320.

Step 335 is a step that acts when the determination in Step 320 is NO (it is not timeout), and determines whether or not it is a time to carry out the regular transmission with a regular transmission packet 201a. Step 336 is step that acts when the determination in Step 335 is YES (it is regular transmission time), and determines whether or not a retransmission request flag is set in Step 323 or later-described Steps 342 and 351 (FIG. 5). Step 337a is a step that acts when the determination in Step 336 is YES (retransmission request is present), and transmits a regular transmission packet 201a based on a transmission command having been transmitted already. Step 338 is a step that acts subsequently to Step 337a, and resets the retransmission request flag.

Step 337b is a step that acts when the determination in Step 336 is NO (retransmission request is absent), and transmits this time's regular transmission packet 201a. Step 339 is a step that acts subsequently to Steps 337b and 338, and that sequentially stores in the reply-waiting data table 203a commands having been transmitted in Steps 337a and 337b; and deletes the old leading regular transmission command and the address in the reply-waiting data table 203a by performing a shift operation of the data table acting as a shift register. The program proceeds to the operation end step 317 when the determination in Step 335 is NO (it is not regular transmission time), or subsequently to Step 339.

Referring now to FIG. 5, Step 340 is a step that acts when the determination in Step 308 (see FIG. 4) is YES (receiving flag operates), and performs sum check of a received data.

In addition, a frame of checksum obtained by the binary addition of individual digits of all frame data from a start data STX to an end data ETX, is added to each transmit-receive packet. It is sum check that performs the binary addition of all frame data from a start data STX to a checksum data, and determines whether or not a result of this binary addition is a normal value 00H.

Step 341 is a step that acts subsequently to Step 340, and determines whether or not there is any error as a result of sum check. Step 342 is a step that acts when the determination in Step 341 is YES (error is present), and sets a retransmission request flag. Step 343 is a step that acts subsequently to Step 342, and deletes the received data in which error is present. Step 344 is a step that acts subsequently to Step 343, and adds 3 counts to a value of the operation means CN1 acting as the first adder-subtracter.

Step 345 is a step that acts subsequently to Step 344, and determines whether or not a current value of the operation means CN1 acting as the first adder-subtracter exceeds 11. Step 346 is a step that acts when the determination in Step 345 or the later-described Step 353 is YES (in excess of 11), and generates a pulse output of the first error detection signal ER1. Step 347 is a step that acts subsequently to Step 346, and resets the first flag having been set in mentioned Step 305 (see FIG. 4). Step 348 is a step that acts when the determination in Step 345 is NO (not more than 11), and carries out standby of a predetermined time period. The program proceeds to the operation end step 317 subsequently to Step 347, and then the operation start step 300 operates in cycle.

In addition, Step Block 319b consists of Step 346 and Step 347, and acts as first initialization means.

Step 350 is a step that acts when the determination in Step 341 is NO (sum check error is absent), and determines whether or not data having been received normally from the substation is the data regarding receiving failure (NACK) at the substation. Step 351 is a step that acts when the determination in Step 350 is YES (receiving failure), and sets a retransmission request flag. Step 352 is a step that acts subsequently to Step 351, and adds 3 counts to a value of the operation means CN1 acting as the first adder-subtracter. Step 353 is a step that acts subsequently to Step 352, and determines whether or not a current value of the operation means CN1 acting as the first adder-subtracter exceeds 11. When the determination in Step 353 is YES (in excess of 11), the program proceeds to Step 346.

Step 360 is a step that acts when the determination in Step 350 is NO (it is not the receiving failure), and determines whether or not a received data is regular report from the substation with a regular report packet. Step 361 is a step that acts when the determination in Step 360 is YES (regular report is received), and restarts a report interval timer T1. Step 362 is a step that acts subsequently to Step 361, and subtracts 1 count from a value of the operation means CN1 acting as the first adder-subtracter. Step 363 is a step that acts subsequently to Step 362, and determines whether or not it is confirmation information such as a sum value with regard to the data memory 126a by checking an address of the regular report having been received. Step 364a is a step that acts when the determination in Step 363 is YES and it is confirmation information such as a sum value, and that compares this confirmation information with reference information having preliminarily been calculated in Step 306. Step 364b is a step that acts when the determination in Step 364a is YES and the information are in no coincidence as a result of comparison, and that performs the retransmission processing of a constant set data. The program proceeds to Step 352 subsequently to Step 364b.

Step 365 is a step that acts when the determination in Step 363 is NO and it a is regular report with regard to an indirect input data, and that stores and saves a regular report data having been received. Step 366 is a step that acts when the determination in Step 353 is NO (not more than 11), when the determination in Step 348 or Step 364a is NO and it is not a comparison error, or subsequently to Step 365 or a later-described Step 374, and that inverts a logic level of a transmission-permitting control signal. Then, the program proceeds to the operation end step 317 subsequently to Step 366.

In addition, Step 348 is a step that delays the logic inversion of a transmission permitting control signal performed by Step 366 when Step 341 determines the presence of receiving error. The second control circuit section 200b is capable of determining whether or not the first control circuit section 200a has normally received data by monitoring logic inversion situations of the foregoing transmission permitting control signal.

Step 370 is a step that acts when the determination in Step 360 is NO (it is not the receiving of regular report), and that determines whether or not it is the receiving of confirmation reply. When the determination in Step 370 is NO (it is not the confirmation reply with respect to regular transmission) the program proceeds to the operation end step 317.

Step 373 is a step that acts when the determination in Step 370 is YES (it is the confirmation reply of normal receiving with respect to regular transmission), and subtracts 1 count from a value of the operation means CN1 acting as the first adder-subtracter. Step 374a is a step that acts subsequently to Step 373, and erases a command, which is replied from the reply-waiting data table 203a, having been stored in the mentioned Step 339 (FIG. 4). Then the program proceeds to Step 366 subsequently to Step 374.

The operations heretofore are described in brief. With reference to FIGS. 4 and 5, Step Blocks 319a and 319b are first initialization means. Step 306 is reference information generation means. Step 310 is first communication error determination means acting as receiving interval monitoring means of regular report. Step 315 is first error occurrence determination means for generating the first error detection signal ER1. Step 320 is first communication error determination means acting as reply delay monitoring means. Step Block 324 is first adder-subtracter consisting of Steps 313 and 321. Step 337a is retransmission means with respect to regular transmission. Step 337a is retransmission means with respect to regular transmission. Step 337b is regular transmission means.

Further, with reference to FIG. 5, Step 340 is first communication error determination means acting as bit information monitoring means. Step 346 is first error occurrence determination means for generating the first error detection signal ER1. Step Block 364 is storage constant confirmation processing means consisting of Step 364a acting as comparison determination means and Step 364a acting as retransmission processing means. Step 366 is transmission permitting control signal generation means. Step Block 375 is first adder-subtracter consisting of Steps 344, 352, 362 and 373.

Figure 6:
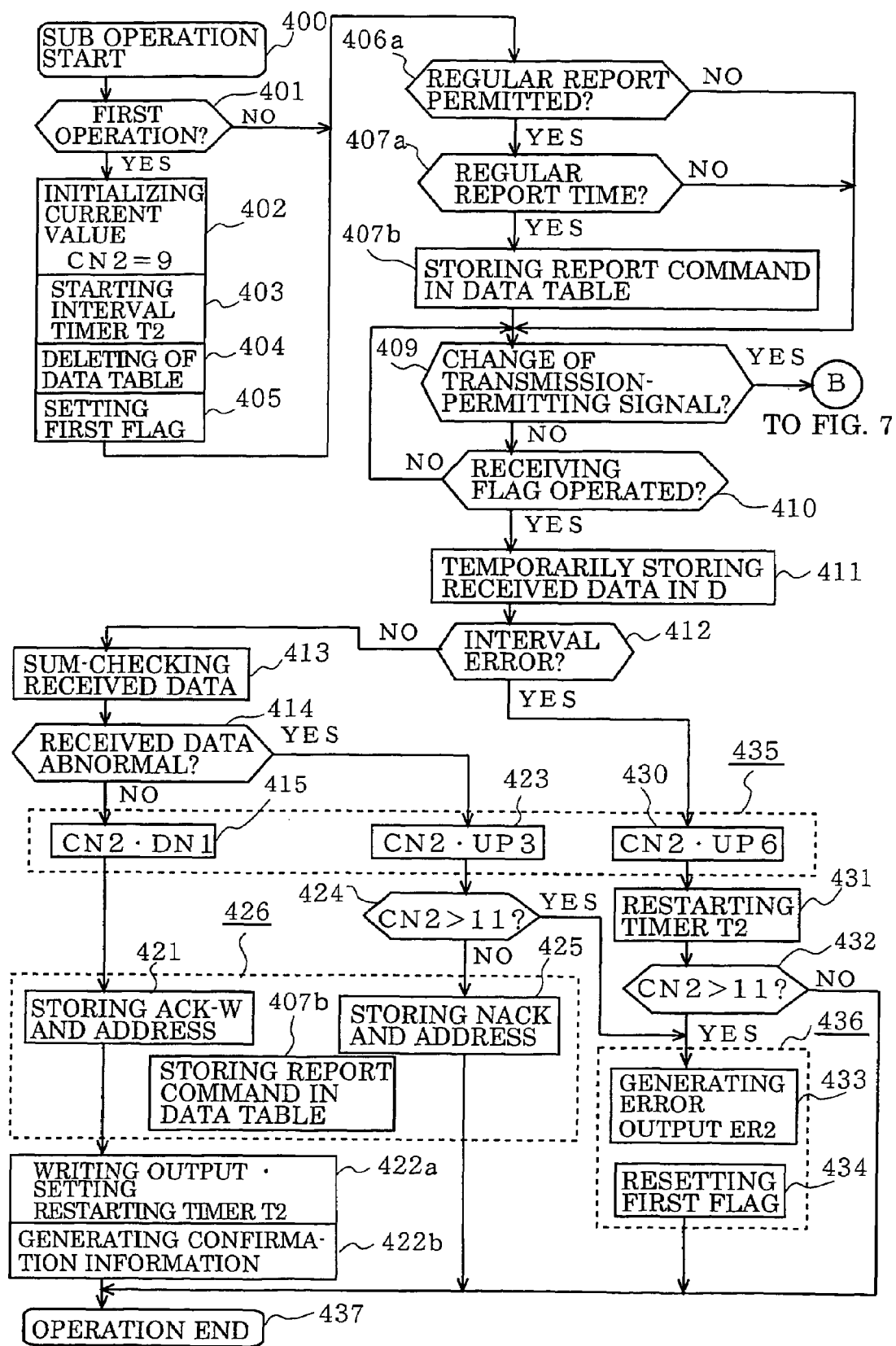
FIG. 6 is a flowchart for explaining transmission operation of the second control circuit section of the electronic control unit according to the first embodiment.
Figure 7:
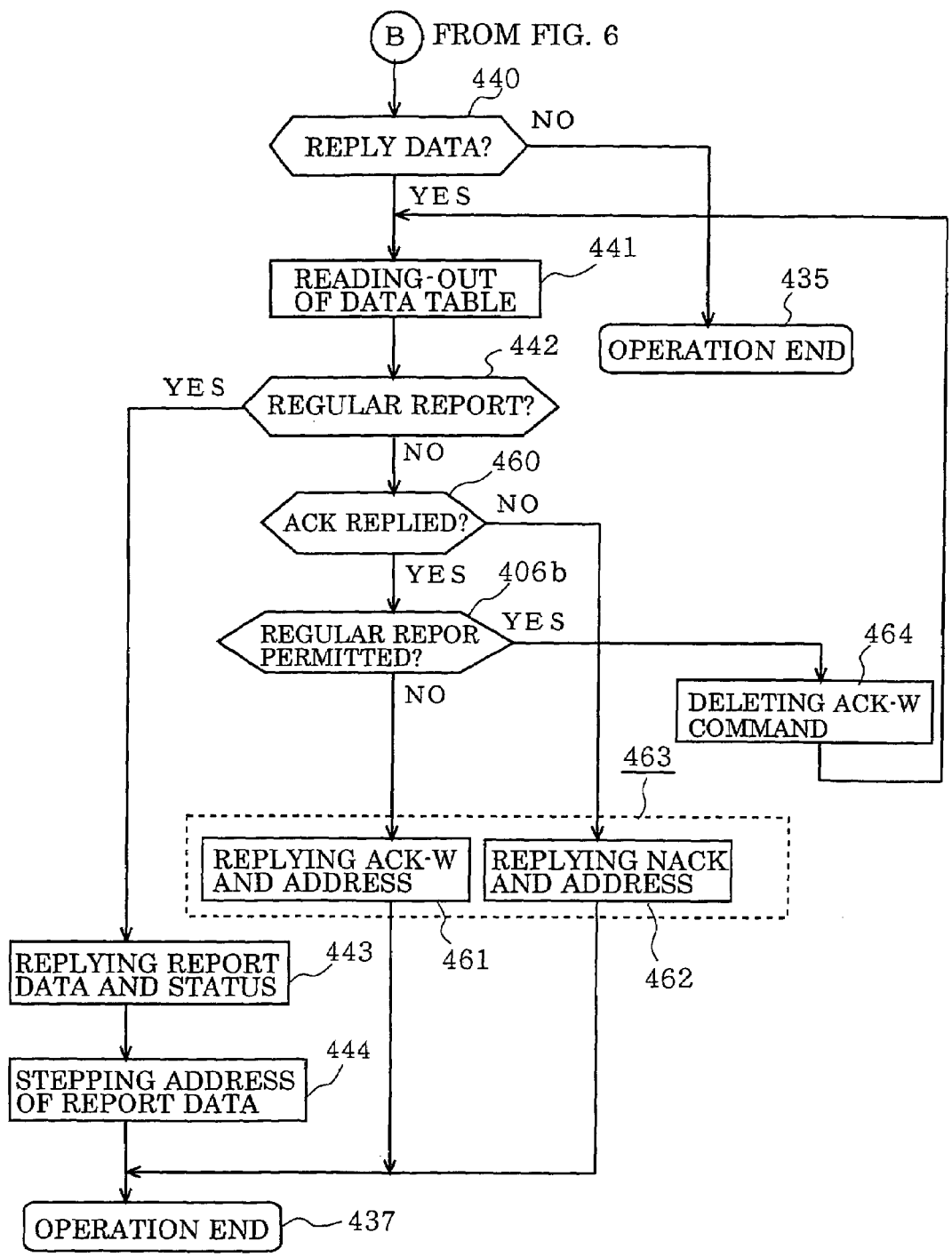
FIG. 7 is a flowchart for explaining receiving operation of the second control circuit section of the electronic control unit according to the first embodiment.

FIGS. 6 and 7 are flowcharts for explaining communication control operation in the second control circuit section 200b of the electronic control unit according to this first embodiment.

FIG. 6 shows mainly an equivalent control flow as to receiving operation of the associative control circuit section 120a in the second control circuit section 200b. FIG. 7 shows mainly an equivalent control flow as to transmission operation of the associative control circuit section 120a in the second control circuit section 200b.

With reference to FIG. 6, Step 400 is an operation start step of the associative control circuit section 120a that is regularly activated. Step 400 is activated when the power supply switch 105b of FIG. 1 is turned on, and when a reset pulse signal RST2 is supplied; and operates in cycle subsequently to the later-described operation end step 437.

Step 401 is a step that acts subsequently to Step 400, and determines whether or not it is the first operation depending on whether or not the first flag is set in the later-described Step 405. Step 402 is a step that acts when the determination in Step 401 is YES (it is the first operation), and sets a current value of second adder-subtracter 208b to an initial value "9". Step 403 is a step that acts subsequently to Step 402, and starts an interval timer T2 of which interval corresponds to an upper limit value of a regular transmission period. Step 404 is a step that acts subsequently to Step 403, and deletes a content of the unprocessed data table 203b of FIG. 2. Step 405 is a step that acts subsequently to Step 404, and sets the first flag, not shown. The mentioned first flag is reset when the power supply switch 105b of FIG. 1 is turned on, and when a reset pulse signal RST2 is supplied to the associative control circuit section 120a.

Step 406a is a step that acts when the determination in Step 401 is NO (it is not the first operation), or subsequently to Step 405, and receives a regular transmission packet 211a of FIG. 3 to determine whether or not the regular report is permitted. Step 407a is a step that acts when the determination in Step 406a is YES (regular report is permitted), and determines whether or not it is regular report time after passing a predetermined time period since the last report. Step 407b is a step that acts when the determination in Step 407a is YES (regular report time has come), and stores a regular report command in the unprocessed data table 203b of FIG. 2.

Step 409 is a step that acts when the determination in Step 406a is NO (regular report has not been permitted yet), when the determination in Step 407a is NO (regular report time has not come yet), when the determination of the later-described Step 410 is NO (receiving flag has not operated yet), or subsequently to Step 407b, and that determines whether or not a logic level of a transmission permitting control signal 207a is inverted, and a transmission permission to the master station is given. When the determination of the Step 409 is YES (change of a transmission permitting signal is present), the program proceeds to Step 440 of FIG. 7.

Step 410 is a step that acts when the determination in Step 409 is NO (transmission permission is absent), and that determines whether or not a receiving flag is operated indicating the fact that the second series-parallel converter 127 receives a serial data having been transmitted from the first series-parallel converter 117 and the parallel conversion of a received data completes. When the determination in Step 410 is NO (no receiving), the program returns to Step 409.

Step 411 is a step that acts when the determination in Step 410 is YES (receiving flag operates), and temporarily stores in a register D a series of received data having been received from the master station. Step 412 is a step that acts subsequently to Step 411, determines whether or not the receiving interval monitoring timer T2 having been started in Step 403 or later-described Steps 422 and 431 is Time's Up. Step 413 is a step that acts when the determination in Step 412 is NO (it is not Time's Up), and performs the sum check of a series of received data having been received by Step 411. Step 414 is a step that acts subsequently to Step 413, and determines whether or not there is any error in a received data. Step 415 is a step that acts when the determination in Step 414 is NO (normal), and subtracts 1 count from a value of operation means CN2 acting as the second adder-subtracter.

Step 421 is a step that acts subsequently to Step 415, and temporarily stores an ACK·61H and address, shown with a confirmation reply packet 201c of FIG. 3. Step 422a is a step that acts subsequently to Step 421, and that stores an output set data or a constant set data having been obtained in Step 411 in a memory of a specified address; and restarts the receiving interval monitoring timer T2. Step 422b is a confirmation information generation step that acts subsequently to Step 422a, and calculates and saves confirmation information such as a sum value with respect to the whole of constant set data having been received.

Step 423 is a step that acts when the determination in Step 414 is YES (received data error), and adds 3 counts to a value of the operation means CN2 acting as the second adder-subtracter. Step 424 is a step that acts subsequently to Step 423, and determines whether or not a current value of the operation means CN2 acting as the second adder-subtracter exceeds 11. Step 425 is a step that acts when the determination in Step 424 is NO (not more than 11), and temporarily stores an NACK·62H and address shown with a confirmation reply packet 211c of FIG. 3. The program proceeds to the operation end step 435 subsequently to Steps 422b and 425.

Step Block 426 consists of Steps 407b, 421, 425. This Step Block 426 is report reply command data to be stored in the unprocessed data table 203b of FIG. 2.

Step 430 is a step that acts when the determination in Step 412 is YES (receiving interval of a regular transmission data is too large), and adds 6 counts to a value of the operation means CN2 acting as the second adder-subtracter. Step 431 is a step that acts subsequently to Step 430, and restarts the receiving interval timer T2. Step 432 is a step that acts subsequently to Step 431, and determines whether or not a current value of the operation means CN2 acting as the second adder-subtracter exceeds 11. Step 433 is a step that acts when the determination in Step 432 is YES (in excess of 11), or when the determination of the mentioned Step 424 is YES (in excess of 11), and that generates a pulse output of the second error detection signal ER2. Step 434 is a step that acts subsequently to Step 433, and resets the first flag having been set in Step 405. When the determination in Step 432 is NO (not more than 11) or subsequently to Step 434, the program goes to the operation end step 437.

In addition, Step block 435 consists of Step 415, Step 423, and Step 430, and acts as the second adder-subtracter.

Further, Step Block 436 consists of Step 433 and Step 434, and acts as the second initialization means.

Now referring to FIG. 7, Step 440 is a step that acts when the determination of mentioned Step 409 (FIG. 6) is YES (transmission permission is present), and that determines whether or not there is a report reply command stored in the unprocessed data table 203b in Step Block 426. Step 441 is a step that acts when the determination in Step 440 is YES (report reply command is present), and reads out a report reply command having been stored in the unprocessed data table 203b on the basis of first-in first-out.

Step 442 is a step that acts subsequently to Step 441, and determines whether or not a command having been read out in Step 441 is a regular report command. Step 443 is a step that acts when the determination in Step 442 is YES (it is a regular report command), and transmits a regular report packet 206a of FIG. 3. Step 444 is a step that acts subsequently to Step 443, and advances an address of the next regular report.

Step 460 is a step that acts when the determination in Step 442 is NO (it is not regular report), and determines whether a report reply command having been read out in Step 441 is normal confirmation reply command (ACK) having been stored in Step 421 or receiving failure confirmation reply command (NACK) having been stored in Step 425. Step 406b is a step that acts when the determination in Step 460 is YES and performance of an ACK reply is determined, and that determines whether or not a regular transmission packet 211a of FIG. 3 is received and regular report is permitted.

Step 461 is a step that acts when the determination in Step 406b is NO and any regular report has not been permitted yet, and replies an acknowledged data ACK and the corresponding address. Numeral 462 is a step that acts when the determination in Step 460 is NO (NACK), and replies a non-acknowledged data NACK and a corresponding address. Step 464 is a step that acts when the determination in Step 406b is YES and regular report is permitted, and that deletes an acknowledged data ACK, which is a leading command in the unprocessed data table 203b, and then returns to Step 441. When the determination in Step 440 is NO (reply data is absent), or subsequently to Steps 444, 461, 462, the program proceeds to the operation end step 437.

In addition, Step Block 463 consists of Steps 461 and 462. This Step Block 463 corresponds to the transmission of confirmation reply packets 201c, 211c, 221c of FIG. 3.

The operations heretofore are described in brief. With reference to FIG. 6, Step 412 is second communication error determination means acting as receiving integral monitoring means of a regular transmission packet. Step 413 is second communication error determination means acting as bit information monitoring means for data having been transmitted from the master station. Step 433 is second error occurrence definition means for generating the second error detection signal ER2. Step Block 436 is second adder-subtracter consisting of Steps 433 and 434.

Further, with reference to FIG. 7, Step 443 is regular report means for transmitting a regular report packet. Step Block 463 is confirmation reply means for transmitting a confirmation reply packet of normal receiving or receiving failure. However, when regular report is permitted, the regular report made by Step 443 is carried out instead of the confirmation reply of normal receiving made by Step 461.

The action and operation are described in brief referring to FIGS. 1, 2, 3 in view of the descriptions based on the flowcharts of FIGS. 4 to 7.

With reference to FIG. 1, the main CPU (microprocessor) 110a takes outputs from the first and second input sensor groups 102a an 102b and the first and second analog sensor groups 103a and 103b as input signals, and controls the first and second current consumer groups 104a and 104b based on a control program or the first constant set data, being a control constant that is stored in the non-volatile program memory 115a. However, the mentioned second input sensor group 102b, the second analog sensor group 103b and the second current consumer group 104b perform a serial communication indirectly with the main CPU 110a via the first and second series-parallel converters 117 and 127.

In addition, although an analog output is not utilized in the first embodiment shown in FIG. 1, it is also preferable to mount a DA converter for a meter display as indirect outputs if necessary.

When the first error detection signal ER1 is generated in the first control circuit section 200a, the first flag is reset in Step 316 of FIG. 4 or in Step 347 of FIG. 5, and then the program proceeds to the operation end step 317. Therefore, when the program goes to the operation start step 300 again, initialization of the first control circuit section 200a itself is carried out in Steps 302-304.

On the other hand, a reset pulse signal is inputted to a reset input terminal RST2 of the second control circuit section 200b with the first error detection signal ER1, whereby the second control circuit section 200b, being the other side, is initialized and restarted as well.

Likewise, when the second error detection signal ER2 is generated in the second control circuit section 200b, the first flag is rest in Step 434 of FIG. 6, and then the program proceeds to the operation end step 437. Therefore, when the program goes to the operation start step 400 again, initialization of the second control circuit section 200b itself is carried out in Steps 402-404.

On the other hand, a reset pulse signal is inputted to a reset input terminal RST1 of the main CPU 110a in the first control circuit section 200a with the second error detection signal ER2, whereby the first control circuit section 200a, being the other side, is initialized and restarted as well.

The first and second control circuit sections 200a and 200b are initialized and restarted also with a reset pulse signal RST1 from the watchdog timer 130. However, upon generation of the first and second error detection signals ER1 and ER2 or a reset pulse signal RST1 generated by the watchdog timer 130, the error storage circuit 131a stores this generation of signals to bring the alarm and display 108 in operation, as well as stops the operation of the load power supply relay 107a so that a power feed with respect to a part of specified current consumers is stopped.

Accordingly, in the case where the main CPU 110a temporarily malfunctions due to noise malfunction, the main CPU will be automatically restarted with a reset pulse RST1. However, the drive stop state of a part of current consumers due to the operation stop of the load power supply relay 107a continues.

Nevertheless, when the power supply switch 105b is turned on again, error storage of the error storage circuit 131a is cleared, thereby enabling to recover to a normal operation state.

With reference to FIGS. 2 and 3, basic transmit-receive communication packets in this first embodiment are arranged of output setting by the regular transmission means 201a from the master station to the substation and input readout by the regular report means 206a from the substation to the master station.

However, to prevent an erroneous output setting, with respect to the transmission from the master station to the substation, communication packets are replied by the normal receiving confirmation reply means 201c or the receiving failure confirmation reply means 211c from the substation to the master station.

In addition, supposing that there is only a reciprocating communication in which the master station transmits and the substation replies to this transmission, the master station waits for a reply from the substation and then carries out the next transmission, thereby enabling to avoid the jam-up of communication.

However, supposing that the substation side intends to transmit the regular report to the master station without command from the master station, e jam-up will occur in the upstream communication.

When occurring such jam-up, the unprocessed data table 203b makes a queue of un-replied information, and sequentially replies the information, thereby enabling to perform regular transmission or regular report on a timely basis.

Furthermore, it is arranged such that regular report from the substation is inhibited at the start of operation when there is much data of downstream communication; and the main CPU 11a is capable of transmitting the second constant set data to the data memory 126a in a concentrated manner.

Features and advantages of the arrangement of the electronic control unit according to the first embodiment of the invention are hereinafter described overall.

The electronic control unit 100a according to the first embodiment includes: a first control circuit section 200a that contains a program memory 115a including input/output control means with respect to an external device, a set data, being a controlling constant having preliminarily been set, and communication control means; an operation processing RAM memory 116a; a microprocessor (main CPU) cooperating with the mentioned program memory 115a; and a first series-parallel converter 117; and a second control circuit section 200b that contains a communication control circuit section 120a for exchanging monitoring and control signals, a data memory 126a, and a second series-parallel converter 127; and in which a serial communication of monitoring and control signals is carried out mutually between the first control circuit section 200a and the second control circuit section 200b via the first series-parallel converter 117 and the second series-parallel converter 127. In the mentioned electronic control unit, the first control circuit section 200a includes regular transmission means 201a and storage constant confirmation processing means 206d, and the second control circuit section 200b includes regular report means 206a.

The regular transmission means 201a regularly transmits in sequence a control output data or a constant set data from the first control circuit section 200a to the second control circuit section 200b, and stores the control output data or constant set data having been received at the second control circuit section 200b in the data memory 126a; the regular report means 206a regularly reports confirmation information with regard to the whole or a part of constant set data that are stored in the data memory 126b from the second control circuit section 200b to the first control circuit section 200a; and the storage constant confirmation processing means 206d compares reference information with regard to the whole or a part of the constant set data having preliminarily been set in the first control circuit section 200a with confirmation information given by the regular report means 206a, and retransmits a constant set data to the second control circuit section 200b with the regular transmission means 201a in the case of no coincidence as a result of comparison.

As a result, a constant set data to be transmitted from the first control circuit section 200a to the data memory 126a of the second control circuit section 200b by the regular transmission means 201a is separately and individually subjected to error check at the time of being received at the second control circuit section 200b. Not only the retransmission processing of a constant set data having been abnormally received is carried out in the case of receiving failure, but also the following processing are carried out after normal receiving. That is, confirmation information such as a sum value with regard to the entire constant set data is generated at the second control circuit section 200b, the confirmation information is regularly reported to the first control circuit section 200a, the mentioned confirmation information is compared with reference information such as a sum value with respect to the entire constant set data having preliminarily been calculated at the first control circuit section 200a, and the whole of constant set data is retransmitted in the case of no coincidence as a result of comparison. Consequently, even if the data memory 126a at the second control circuit section 200b is changed due to, e.g., influence of noise, it is possible to immediately detect this change, and reset the data memory 126a with a correct data.

Further, in the electronic control unit 100a according to the first embodiment, the mentioned first control circuit section 200a includes regular report permitting means 211a for storing a command data that is transmitted by the regular transmission means 201a to a predetermined address of memory provided in the second control circuit section 200b and that serves to permit the second control circuit section 200b to transmit the regular report; the regular report made by the regular report means 206a is not permitted, and the regular transmission means 201a transmits mainly a constant set data immediately after the start of operation of the microprocessor 110a; the regular report made by the regular report means 206a is permitted accompanied with the completion of transmitting a constant set data; and the regular transmission means 201a transmits mainly a control output data.

As a result, it is possible to diminish communication control load on the master station side, and to transmits a constant set data without delay by permitting no regular report when there are much downstream communication of various setting information from the first control circuit section acting as the master station to the second control circuit section acting as the substation at the start of operation.

Further, in the electronic control unit 100a according to the first embodiment, the first control circuit section 200a further includes transmission permitting control signal generation means 207a, and the second control circuit section 200b further includes an unprocessed data table 203b. The unprocessed data table 203b is a receiving side command memory having a first-in first-out structure arranged so as to sequentially save command data for performing regular report and confirmation reply in order of generation, as well as to sequentially erase these save command data when data of regular report and confirmation reply with respect to the first control circuit section are transmitted. The transmission permitting control signal generation means 207a is control signal delivery means from the first control circuit section 200a to the second control circuit section 200b; and the second control circuit section 200b having received a signal that is sent from this control signal delivery means starts transmitting the first-in leading command in the unprocessed data table 203b, as well as adds the latest confirmation information with regard to the latest monitoring input data or the mentioned constant set data to this leading command, and transmits the resulting command in the case where the leading command is regular report.

As a result, in the case where the generation of a transmission permitting control signal is delayed due to congestion situations of the first control circuit section 200a, or the confirmation reply and the regular report occur substantially at the same time, communication jam-up can be prevented by performing transmission standby with the unprocessed data table 203b, thereby enabling to further diminish the communication control load of the first control circuit section 200a.

Further, at the moment of transmission to the regular report it is possible to add the latest information with respect to the first control circuit section 200a.

Furthermore, in the electronic control unit 100a according to the first embodiment, the transmission permitting control signal generation means 207a generates a control signal in which logic level inverts alternately every time the first control circuit section 200a receives data of regular report and confirmation reply from the second control circuit section 200b.

As a result, the second control circuit section 200b makes the transmission to the first control circuit section 200a, and then monitors the presence or absence of the change in logic level of a transmission permitting control signal after a predetermined time period has passed, thereby enabling to detect a receiving state on the other side.

In the electronic control unit 100a according to the first embodiment, the first and second control circuit sections 200a and 200b further comprise first and second communication error determination means 201d, 206b, 201b, first and second adder-subtracters 208a and 208b, and first and second error occurrence definition means 209a and 209b respectively. The first communication error determination means 201d and 206b and the second communication error determination means 201b act as receiving error determination means for determining the presence or absence of error with regard to various regular and irregular communication packets received by the control circuit section on the side where these determination means are provided from the other control circuit section, or determining a state of being incapable of receiving a communication packet having to be received. The first and second adder-subtracters 208a and 208b act as operation means that adds or subtracts a second variation value when the receiving error determination means determines the presence of error, and subtracts or adds a first variation value when the receiving error determination means determines the absence of error to perform an addition-subtraction compensation with respect to a current value memory so as to mutually counteract; and that stops the addition-subtraction compensation with the mentioned first variation value at a predetermined normal-side limit value when no error determination continues. The first and second error occurrence definition means 209a and 209b act as comparison means for generating error detection signals ER1 and ER2 when a current value of the adder-subtracters 208a and 208b come to be outside a region of a predetermined error-side limit value resulted from accumulation of the mentioned first and second variation values.

Furthermore, the mentioned second variation value is set to be a value smaller than a permitted accumulation value, being a difference between the mentioned error-side limit value and normal-side limit value, and stopping the operation, or initialization and restart of the mentioned first or second control circuit section 200a, 200b is carried out responsive to the generation of the mentioned error detection signals ER1 and ER2.

As a result, a feature exists in that too sensitive error determination is not carried out with respect to a sporadic and chronic error; and that the error determination is made responsive to the fact that a current value of the first adder-subtracter 208a comes to be outside the region of an error-side limit value, and the initialization and restart is carried out in the case where a communication error still occurs even if the retransmission processing continues. Consequently, it is possible to rationally regulate the permitted number of times of retransmission processing depending on a past history of whether or not a normal communication has continued.

In the electronic control unit 100a according to the first embodiment, storage constant confirmation processing means 206d, which the first control circuit section 200a contains, further includes reference information generation means 306, comparison determination means 364d, retransmission processing means 364b, and addition-subtraction processing means. The reference information generation means 306 is means for transferring a part or all of constant set data that is stored in the program memory 115a to the mentioned RAM memory 116a and for calculating reference information, e.g., a binary addition value with regard to the whole of constant set data to be transmitted to a data memory 126b that is provided in the mentioned second control circuit section 200b out of constant set data having been transferred to the mentioned RAM memory, or a remainder value obtained by dividing this binary addition value by a predetermined constant. The comparison determination means 364a is means for performing a comparison of numerical values with confirmation information 205c, e.g., a binary addition value with regard to the whole of constant set data that is stored in the mentioned data memory 126a having been reported from the second control circuit section 200b by regular report means 206a, or a remainder value obtained by dividing this binary addition value by a predetermined constant, and for making an error determination. The retransmission means is means for acting when the determination of the comparison determination means 364a is no coincidence as a result of comparison, and for transferring again a constant set data that is stored in the program memory 115a to the mentioned RAM memory 116a, as well as for transmitting again the constant set data, having been transferred to this RAM memory 116a, to the data memory 126a with the regular transmission means 201a. The addition-subtraction processing means is means for acting when the mentioned comparison determination means determines no coincidence as a result of comparison, and for adding or subtracting a predetermined variation value with respect to the first adder-subtracter 208a to cause a current value of the first adder-subtracter 208a to approach to the error side.

As a result, even if the data memory 126a at the second control circuit section 200b is changed due to, e.g., influence of noise, it is possible to immediately detect this change, and reset the data memory 126a with a correct data. Likewise, even if the RAM memory 116a is changed due to, e.g., influence of noise, it is possible to immediately detect this change, and reset the RAM memory 116a with a correct data.

The first adder-subtracter 208a operates not only responding to the first communication error, but also responding to a comparison determination result of a confirmation information numerical value with regard to the entire content of the data memory 126a that is provided in the second control circuit section 200b. When an error as the result of the foregoing comparison determination continue or sporadic communication error has already occurred, it is possible for the first adder-subtracter 208a to generate the first error detection signal ER1 resulting in the performance of initialization and restart. After the normal communication has continued, however, it is possible for the first adder-subtracter 208a to prevent the initialization and restart for no reason responding to an error resulted from just one comparison determination.

In the electronic control unit 100a according to the first embodiment, the first and second control circuit sections 200a and 200b further include first and second initialization means 319a, 319b, 436 respectively. The first initialization means 319a, 319b is means for acting when the first error occurrence definition means 209a generates an error detection signal ER1, and for resetting a current value of the first adder-subtracter 208a to a predetermined initialization value at the start of operation, as well as for initializing and restarting a communication control circuit section 120a provided in the mentioned second control circuit section. The second initialization means 436 is means for acting when the second error occurrence definition means 209b generates an error detection signal ER2, and for resetting a current value of the second adder-subtracter 208b to a predetermined initialization value at the start of operation, as well as for initializing a microprocessor 11a provided in the first control circuit section 200a to restart or stop the operation thereof.

The initialization value of the first and second adder-subtracters to be reset by the first and second initialization means 319a, 319b, 436 is a value more close to the mentioned error-side limit value from the mentioned normal-side limit value.

As a result, it is possible to initialize a control circuit section on the other side without depending on a communication line where any error occurs. In addition, since a current value of the adder-subtracter is made closer to an error-side limit value at the time of restart, it is possible to achieve improvement in safety immediately after the start.

Further, in the electronic control unit 100a according to the first embodiment, the first and second communication error determination means 201a, 206b, 201b further include at least one of bit information monitoring means 340, 413 and reply delay monitoring means 320 or receiving interval monitoring means 310, 413. The bit information monitoring means 340, 413 is bit error determination means for determining the presence or absence of the lack and mix of bit information such as parity check or sum check with respect to a serial data exchanged between the first and second control circuit sections. The reply delay monitoring means 320 is reply response error determination means for making the error determination at the first control circuit section 200a, being a source side, when a reply data from the second control circuit section 200b to a data, which the first control circuit section 200a has transmitted, cannot be received even if a predetermined reply response time period has passed. The receiving interval monitoring means 310, 412 are receiving interval error determination means for making the error determination when a receiving interval time period of the other-side control circuit section with respect to a regular transmission data, which the first control circuit section transmits, or a regular report data, which the second control circuit section transmits, exceeds a predetermined value.

Further, the adder-subtracter 208a, 208b performs an addition-subtraction compensation with a first variation value when none of the bit information monitoring means, reply delay monitoring means, and receiving interval monitoring means makes the error determination.

As a result, a variety of determinations of communication error enable the improvement in detection accuracy and the early detection for communication error; and since definition of error occurrence is carried out with data collected at a pair of adder-subtracters, a highly accurate error determination can be carried out.

In the electronic control unit 100a according to the first embodiment, the mentioned second variation value, which the mentioned adder-subtracter 208a, 208b adds or subtracts when the determination of the bit information monitoring means 340, 413 is a communication error, is set to be a value larger than the mentioned first variation value; as well as a variation value, which the mentioned adder-subtracter 208a, 208b adds or subtracts when the determination of the mentioned reply delay monitoring means 320 or receiving interval monitoring means 310, 412 is communication error, is set to be a third variation value, being a value different from the mentioned second variation value; and, furthermore, this third variation value is set to be a value smaller than a permitted accumulation value, being a difference between the mentioned error-side limit value and normal-side limit value.

As a result, it is possible to make the error determination with weighting a variety of determinations of communication error. Further, it is unnecessary to set any excessive float as to a threshold value for determining timeout error such as reply delay or receiving interval excess, and it is possible to set a determination time period in accordance with a raw power, thus enabling to carry out a highly accurate timeout determination.

Furthermore, in the electronic control unit 100a according to the first embodiment, the first control circuit section 200a further includes a direct input/output signal interface circuit 112a, 114a, and either one of the mentioned first or second control circuit section 200a, 200b further includes a watchdog timer 130 and error occurrence storage means 131a. The mentioned direct input/output signal interface circuit 112a, 114a are bus-connected to the mentioned microprocessor 11a; this microprocessor is arranged so as to generate an output signal in response to a direct input signal having been inputted via the mentioned direct input signal interface circuit 112a, an indirect input signal having been received by a serial communication from a second series-parallel converter 127 provided in the mentioned second control circuit section 200b, and a content of the mentioned program memory 115a to drive a first current consumer group 104a that is connected to the mentioned direct output signal interface circuit 114a, as well as to transmit an indirect output signal to the second control circuit section via the mentioned first and second series-parallel converters.

Further, the mentioned watchdog timer 130 is a run-away monitoring timer circuit that monitors a watchdog clear signal WD1, being a pulse train, which the mentioned microprocessor 110a generates, and that generates a reset pulse signal RST1 when a pulse width of this watchdog clear signal WD1 exceeds a predetermined value. The mentioned error occurrence storage means 131a is an error storage circuit that stores the mentioned first and second error detection signals ER1 and ER2 or reset pulse signal RST1 eventually to bring annunciation means 108 such as alarm, display, printing, and history save in operation when these first and second error detection signals are generated, and when this reset pulse signal RST1 is generated by the mentioned watchdog timer 130.

Furthermore, the mentioned microprocessor 110a is initialized and restarted when the watchdog timer 130 generates a reset pulse signal RST1 and when the second error detection signal ER2 is generated, as well as a communication control circuit section 120a of the mentioned second control circuit section 200b is initialized and restarted when the mentioned watchdog timer 130 generates a reset pulse signal RST1 and when the mentioned first error detection signal ER1 is generated.

As a result, it is possible to restart the microprocessor 110a without depending on a communication line where any error occurs. In addition, and an error detection signal as to communication is generated with plural times of communication errors, while the error storage or restart is carried out immediately in response to the occurrence of a watchdog timer error, thus enabling to announce errors with weighting on the error processing being changed.

Further, even in the case where the microprocessor 110a is normally restarted at once due to temporary noise malfunction, the fact that error has occurred come to be apparent, thereby enabling to induce maintenance inspection.

EMBODIMENT 2

Figure 8:
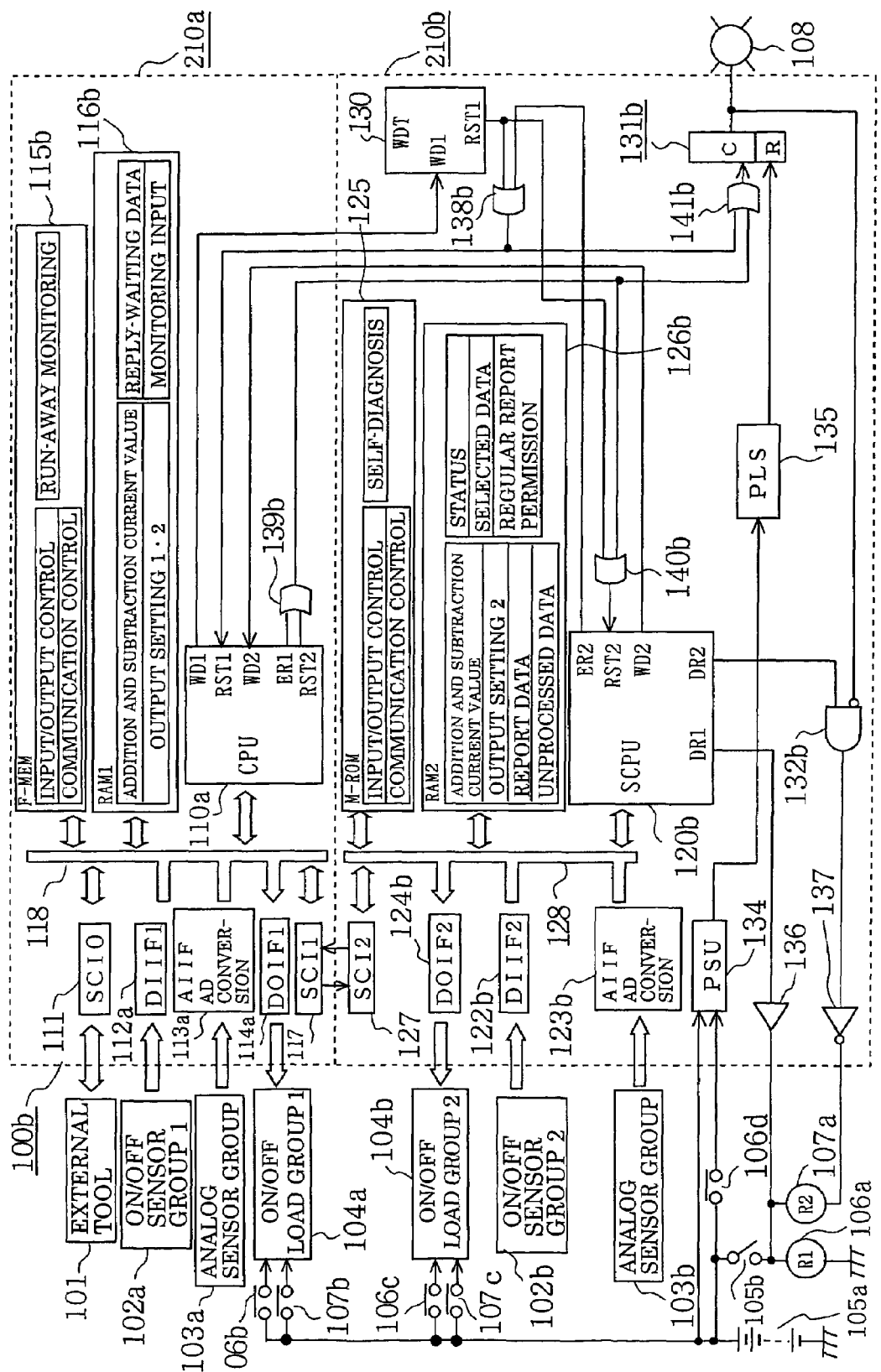
FIG. 8 is a block diagram showing an entire constitution of an electronic control unit according to a second preferred embodiment.

FIG. 8 is a block diagram showing the entire constitution of an electronic control unit according to a second preferred embodiment of the invention.

Major points of difference between the electronic control unit according to the foregoing first embodiment shown in FIG. 1 and the electronic control unit according to this second embodiment shown in FIG. 8 are as follows. In the electronic control unit according to the foregoing first embodiment of FIG. 1, the associative control circuit section (communication control circuit section) 120a is formed of integrated circuit elements employing a logical circuit. Whereas, in the electronic control unit according to this second embodiment of FIG. 8, an auxiliary CPU 120b is provided, and irregular transmission means is added to the first control circuit section.

Referring now to FIG. 8, constitution of the electronic control unit 100b according to the second embodiment is described.

The electronic control unit 100b according to this second embodiment consists of a first control circuit section 210a and a second control circuit section 210b. The first control circuit section 210a includes a microprocessor 110b acting as a main CPU, a non-volatile program memory 115b and a RAM memory for operation processing such as flash memory that cooperate with the foregoing main CPU.

Written in the program memory 115b are a program acting as run-away monitoring means with respect to a later-described auxiliary CPU 120b besides a program acting as input/output control means, and a first and second constant set data acting as control constant or a program acting as communication control means.

Transferred and written in the foregoing RAM memory 116b for operation processing are: a current value data of a later-described first adder-subtracter, an output set data with respect to the mentioned first and second current consumer group 104a and 104b, the later-described reply-waiting command data, or a monitoring input data such as indirect input information or status information having been reported from the mentioned second control circuit section 210b; and the first and second control constants that are stored in the program memory 115b. Further, at least reference information such as a sum value regarding the whole of second constant set data is also stored in the RAM memory 116b.

The second control circuit section 210b includes a microprocessor acting as an auxiliary CPU (i.e., auxiliary CPU) and an auxiliary program memory 125 and an auxiliary RAM memory 126b that cooperate with the mentioned auxiliary CPU 120b.

Stored in the auxiliary program memory 125 are a program acting as input/output control means, a self-diagnosis program, or a communication control program in the second control circuit section 210b.

Further, written in the auxiliary RAM memory 126b acting as data memory are a current value data of a later-described second adder-subtracter, an output set data with respect to the second current consumer group 104b having been transferred from the main CPU 110b or a regular report permission signal, or a later-described unprocessed command data; as well as report data to be transmitted to the main CPU 110b, status information, a selected data, or the second constant set data having been transmitted via the first and second series-parallel converters 117 and 127 from the RAM memory 116b, and confirmation information such as a sum value with regard to the whole of this second constant set data.

In addition, the main CPU 110b monitors a pulse width of a watchdog clear signal WD2, which the auxiliary CPU 120b generates, and generates a reset pulse signal RST2 when the mentioned pulse width exceeds a predetermined value.

A count storage circuit 131b includes a count input, a reset input and a count-up output. An OR element 138b resets the main CPU 110b to be restarted with an OR output with respect to a reset pulse signal RST1, which the watchdog timer 130 generates, and the second error detection signal ER2, which the auxiliary CPU 120b generates.

An OR element 139b includes an OR output with respect to the first error detection signal ER1, and a reset pulse signal RST2, which signals the main CPU generates. An OR element 140b resets and restarts the auxiliary CPU 120b with an OR output with respect to a reset pulse signal RST1, which the watchdog timer 130 generates, and an output from the OR element 139b.

An OR element 141b operates using outputs from the OR elements 138b and 139b as inputs, and an OR output thereof is connected to a count input terminal of the count storage circuit 131b.

In addition, the count storage circuit 131b counts and stores an operation number of the reset pulse signals RST1 and RST2 or the first and second error detection signals ER1 and ER2. Further, the count storage circuit 131b drives the alarm and display 108 when the foregoing count value is not less than a predetermined value; and a count storage value thereof is reset by the power supply detection circuit 135 when the power supply switch 105b is closed.

A gate circuit 132b acting as drive stop means is connected to an input circuit of an inversion drive element 137 that drives the load power supply relay 107a. A drive output DR2, which the auxiliary microprocessor 120b generates, operates in an active manner when the count storage circuit 131b does not count up.

Additionally, the auxiliary CPU 120b generates a drive output DR1 to keep the operation of the power supply relay 106a via the drive element 136, and generates the second error detection signal ER2 or a watchdog clear signal WD2.

Figure 9:
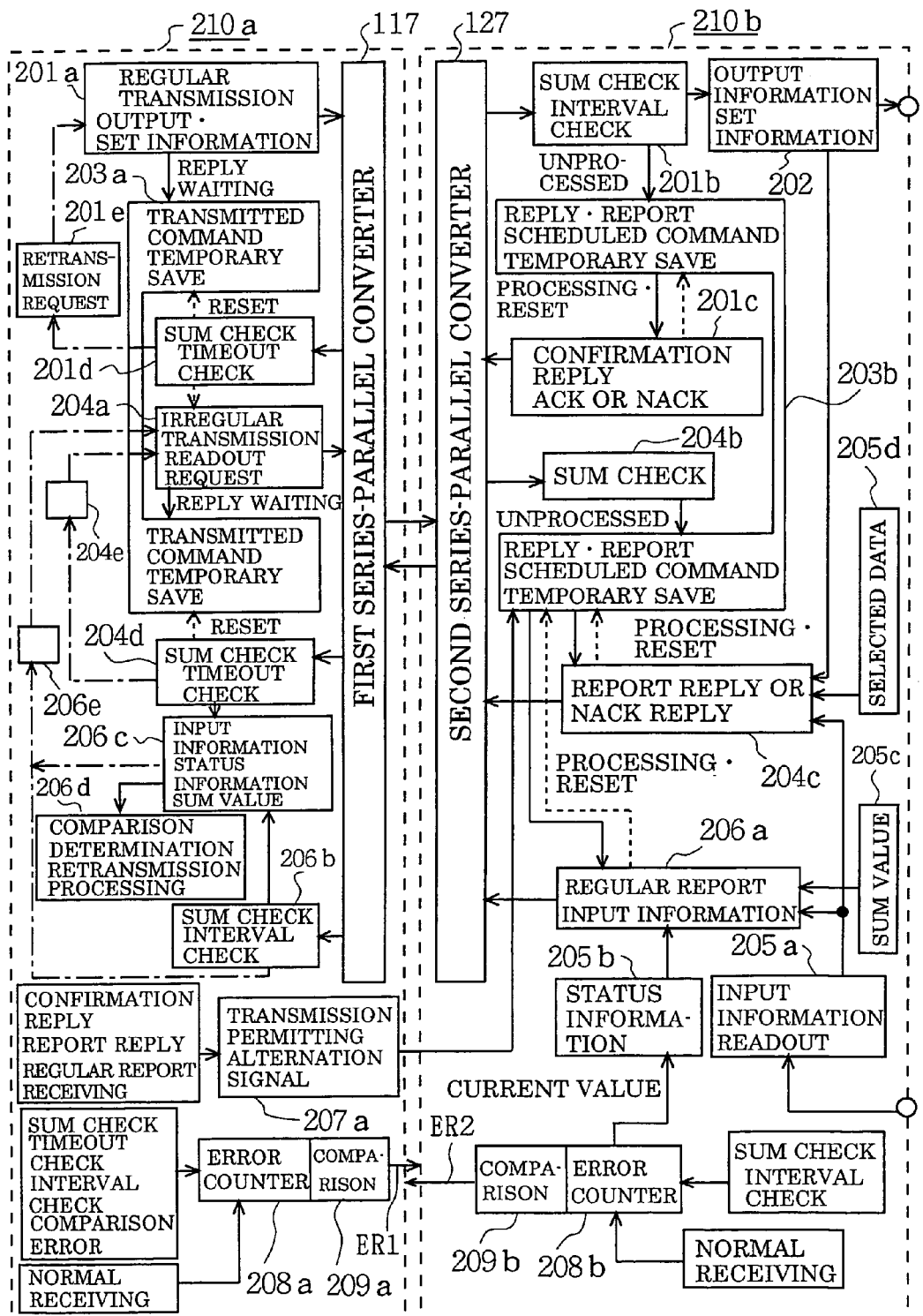
FIG. 9 is a communication control block diagram for explaining communication control operation of the electronic control unit according to the second embodiment.

FIG. 9 is a communication control block diagram for explaining communication control operation of the electronic control unit according to the second embodiment shown in FIG. 8.

Communication control operation of the electronic control unit according to this second embodiment is hereinafter described, focusing on points different from FIG. 2 being a communication control block diagram of the electronic control unit according to the first embodiment.

With reference to FIG. 9, Block 204a is irregular transmission means by which readout request is transmitted from the master station to the substation when the master station makes a readout request to the substation. Block 204b is second communication error determination means in which communication error determination is made on the substation side having received a communication packet transmitted by the foregoing irregular transmission means. In the unprocessed data table 203b, receiving failure NACK as a result of determination made by the determination means 204b, or an address of reply information having to be reported or replied is stored along with a replying command.

Block 204c is report reply means of which report is replied from the substation to the master station. The report reply means replies a communication packet corresponding to a leading reply command data having been stored at the earliest time and remaining in the unprocessed data table 203b. Further, the leading reply command data in the unprocessed data table 203b is deleted accompanied with the transmission of a communication packet by the report reply means 204c.

Additionally, in the unprocessed data table 203b, a reply command data corresponding to the regular transmission packet 201a, a reply command data corresponding to the irregular transmission packet 204a, and a regular report command data corresponding to the regular report packet 206a, are synthesized to be stored in order of generation. Then, these data are replied sequentially in such a manner that the older ones are fetched out first on the basis of first-in first-out.

Likewise, when a regular transmission packet 201a or irregular transmission packet 204a is transmitted, transmission command data are sequentially stored in the reply-waiting data table 203a.

Block 204d is first communication error determination means in which communication error determination is made on the master station side having received a reply data from the substation. Block 204e is retransmission request means. When the determination of normal receiving is made by the determination means 204d, a leading command data that is stored in the reply-waiting data table 203a is deleted; as well as input information relative to an address, which is specified with a report reply packet 204c, is stored and saved by the later-described input information storage means 206c.

Further, it is arranged such that when the determination block 204d normally receives a receiving failure data NACK of the substation side or when the determination block 204d makes the determination of receiving error with respect to a reply data, retransmission processing is carried out with an irregular transmission packet 204a by the retransmission request means 204e. Upon this retransmission processing, an old save data in the reply-waiting data table 203a is deleted, and a transmission command data having been retransmitted is stored anew.

Block 206e is readout request means that acts when a readout request flag is contained in status information having been regularly reported. The irregular transmission means 204e, which operates based on the foregoing readout request means 206e, is capable of reading out a selected data such as self-diagnosis information in the second control circuit section 210b by specifying an address in which a selected data 205c is stored.

Further, even when the determination means 206b determines the receiving error, the readout confirmation made by the readout request means 206e can be performed. In actual, however, when the receiving error still exists after having waited for the next regular report, the readout confirmation is carried out.

FIG. 10 are block diagrams showing communication packets of a serial communication in the electronic control unit according to the second embodiment, shown in FIG. 8.

An irregular transmission packet added to the electronic control unit according to the second embodiment is described.

With reference to FIG. 10, table 204a is communication packet acting as irregular transmission means in the case of making the readout request (readout from the substation to the master station) of various data from the master station to the substation. At the time of the readout request, first an irregular transmission packet 204a from the master station to the substation is transmitted, and an address of data intended to read out is specified.

In addition, the irregular transmission packet 204a consists of five frames of a start data 55H, a command 30H, a readout location address, an end data AAH, and a checksum data.

Table 204c is a communication packet acting as report reply means in which communication packet is replied to the master station at the time of normal receiving. This report reply packet consists of six frames of a start data 25H, a readout data 1, a readout data 2, a readout location address, an end data AAH, and a checksum data.

Further, the mentioned readout location address is a storage location address of readout data 1. In the case where a readout data is 8 bits of data, readout data 2 is the data having an older number address following readout data 1.

Furthermore, in the case where a readout data of the readout location address is 16 bits of data, readout data 1 is the data of upper 8 bits, and readout data 2 is the data of lower 8 bits.

Table 214c is a communication packet acting as confirmation reply means in which communication packet is replied to the master station at the time of error receiving. This confirmation reply packet consists of five frames of a start data 55H, a non-acknowledged data 72H, a readout location address, an end data AAH, and a checksum data.

Figure 11:
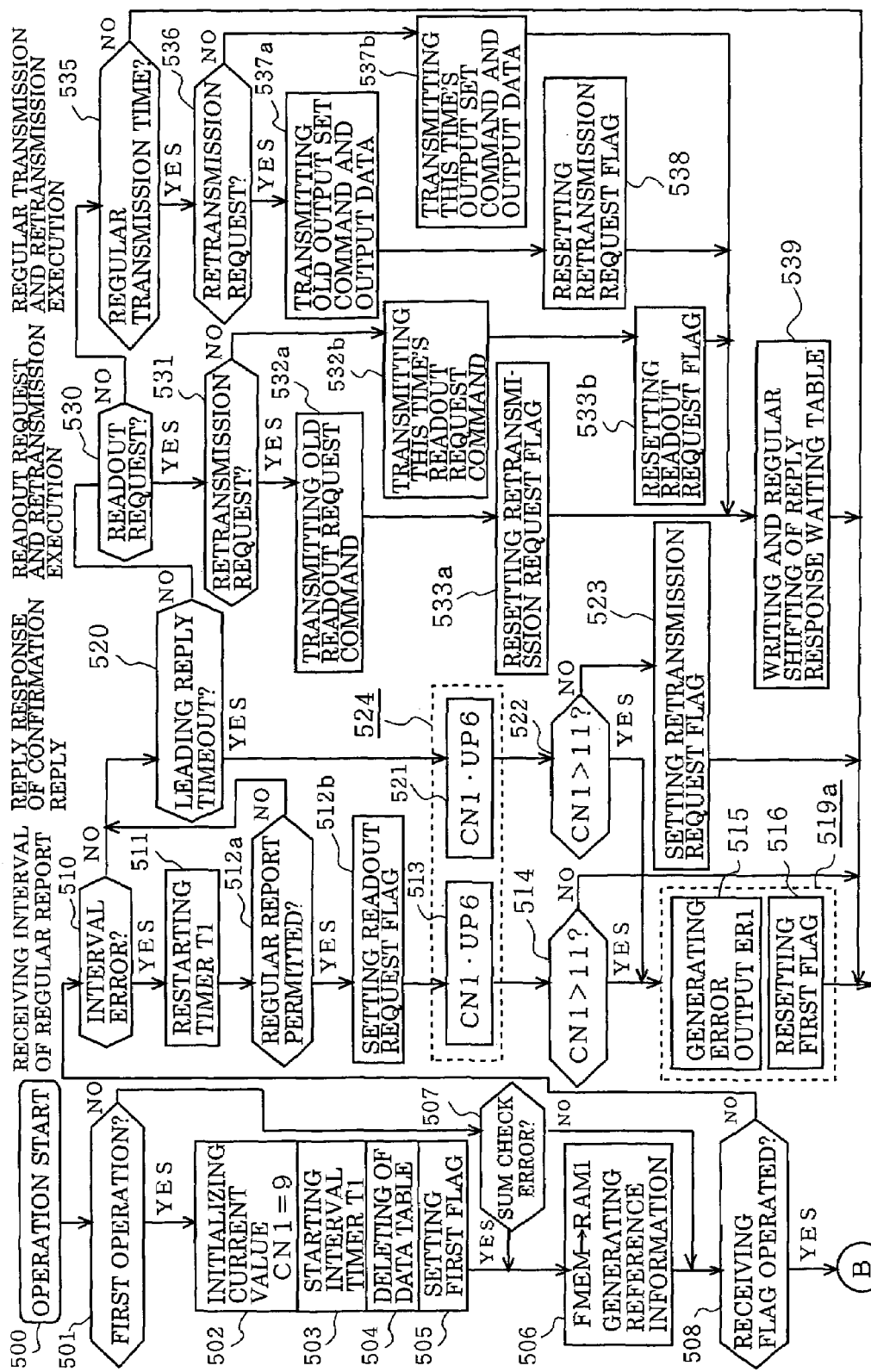
FIG. 11 is a flowchart for explaining transmission operation of the first control circuit section of the electronic control unit according to the second embodiment.
Figure 12:
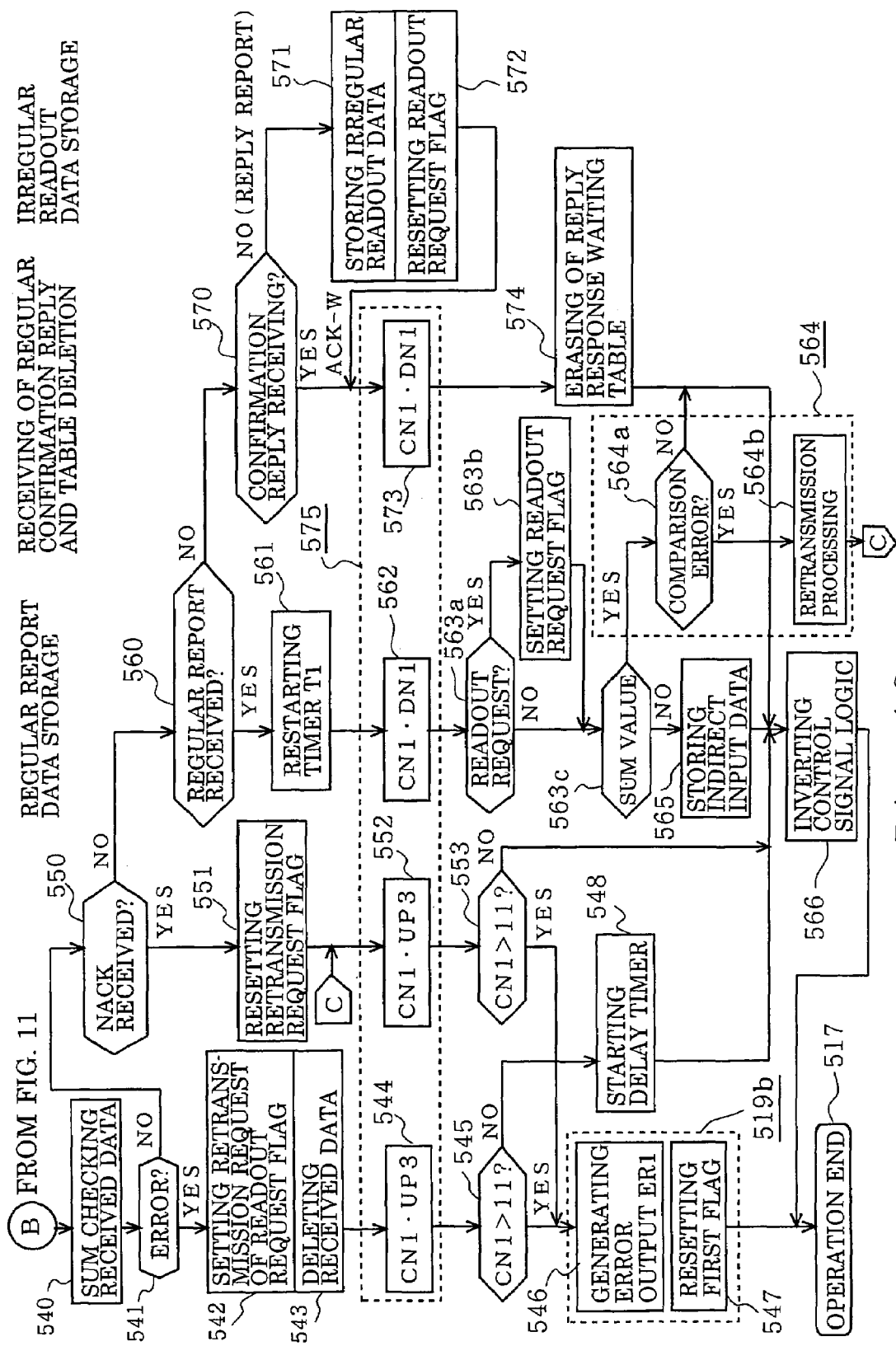
FIG. 12 is a flowchart for explaining receiving operation of the first control circuit section of the electronic control unit according to the second embodiment.
Figure 1:
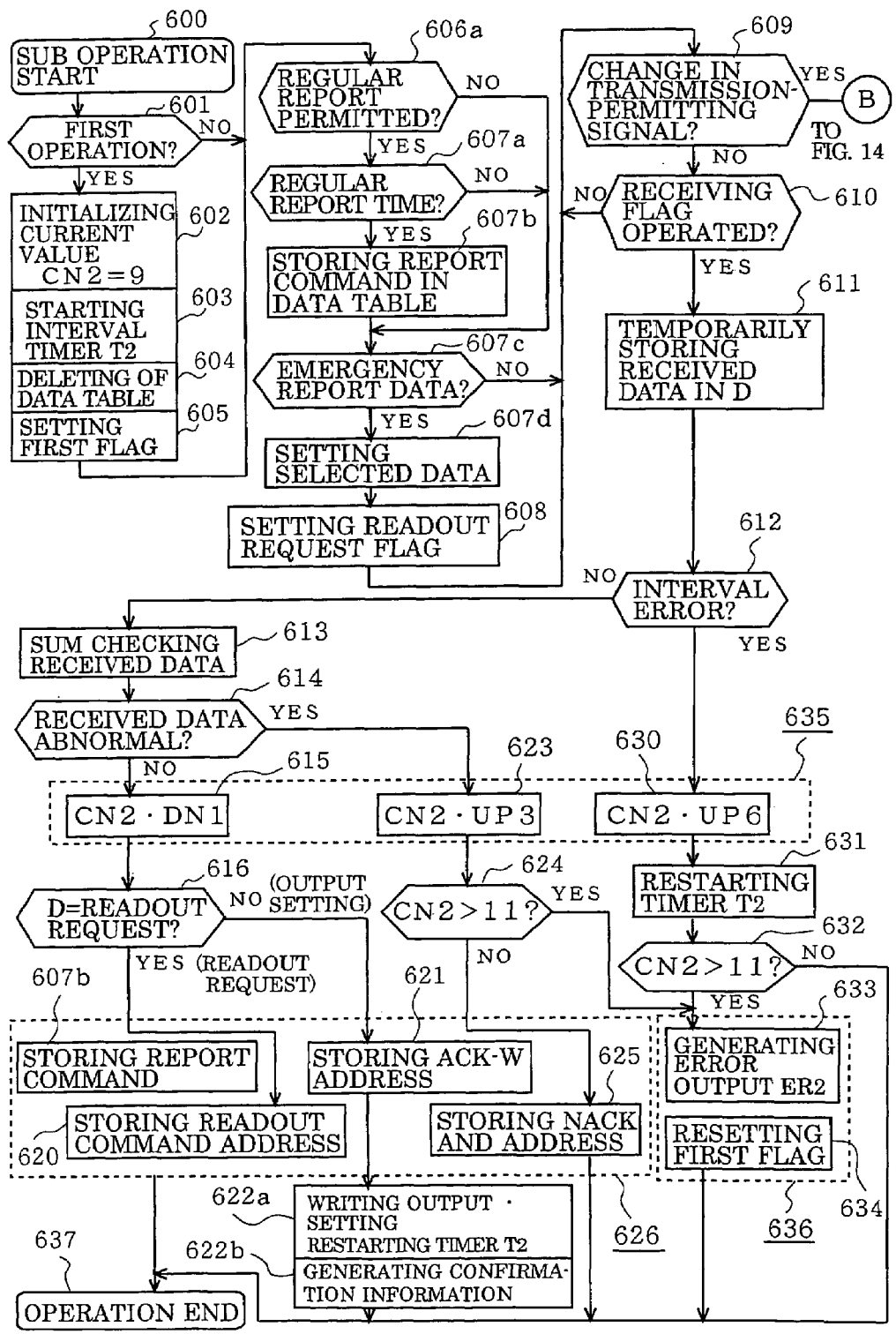

FIGS. 11 and 12 are flowcharts for explaining communication control operation in the first control circuit section 210a of the electronic control unit according to this second embodiment.

FIG. 11 shows mainly a flow of transmission operation in the first control circuit section 210a. FIG. 12 shows mainly a flow of receiving operation in the first control circuit section 210a.

With reference to FIGS. 11 and 12, operations of the electronic control unit according to the second embodiment are described in detail.

Referring to FIG. 11, Step 500 is an operation start step of the main CPU 110b that is regularly activated. Step 500 is activated when the power supply switch 105b of FIG. 8 is turned on, and when a reset pulse signal RST1 is supplied to the main CPU 110b; and operates in cycle subsequently to the later-described operation end step 517.

Step 501 is a step that acts subsequently to Step 500, and determines whether or not it is the first operation depending on whether or not the first flag is set in the later-described Step 505. Step 502 is a step that acts when the determination in Step 501 is YES (it is the first operation), and sets a current value of the first adder-subtracter 208a to an initial value "9". Step 503 is a step that acts subsequently to Step 502, and starts an interval timer T1 of which interval corresponds to an upper limit value of a regular report period. Step 504 is a step that acts subsequently to Step 503, and deletes a content of the reply-waiting data table 203a of FIG. 9. Step 505 is a step that acts subsequently to Step 504, and sets the first flag, not shown. The mentioned first flag is reset when the power supply switch 105b of FIG. 8 is turned on, and when a reset pulse signal RST1 is supplied to the main CPU 110b.

Step 506 is a step that subsequently to Step 505, and that transfers to the RAM memory 116b the first and second constant set data, being a control constant data in the program memory 115b, and generates a reference information, e.g., a binary addition value with regard to the whole of the second constant set data to be transmitted to the auxiliary RAM memory 126b, or a remainder value obtained by dividing this addition value by a predetermined constant. Step 507 is a step that acts when the determination in Step 501 is NO, that is, it is not the first operation, and that carries out the sum check regarding the entire control constant data having been stored in the RAM memory 116b. When the determination result of Step 507 is the presence of sumcheck error, the program goes to Step 506.

Step 508 is a step acting when the determination in Step 507 is NO (there is no sum-check error), or subsequently to Step 506, and determining whether or not a receiving flag is operated indicating that the first series-parallel converter 117 receives a serial data having been transmitted from the second series-parallel converter 127, and that the parallel conversion of a received data completes. When the determination in Step 508 is YES (receiving completion), the program proceeds to Step 540 shown in FIG. 12.

Step 510 is a step that acts when the determination in Step 508 is NO (receiving flag has not operated yet), and determines whether or not the timer T1 having been started in Step 503, or the later-described Step 511 or 561 (FIG. 12) is Time's Up (i.e., determines whether or not there is any error as to a receiving interval of regular report). Step 511 is a step that acts when the determination in Step 510 is YES (Time's Up), and restarts the timer T1. Step 512a is a step that acts subsequently to Step 511, and determines whether or not the regular transmission has been permitted already depending on an operation state of a transmission permitting flag, not shown, that is set when the regular report permission is transmitted with a regular transmission packet 211a. Step 512b is a step that acts when the determination in Step 512a is YES, that is, the regular transmission has been permitted already, and sets a readout request flag. Step 513 is a step that acts subsequently to Step 512b, and adds 6 counts to a value of operation means CN1 acting as the first adder-subtracter.

Step 514 is a step that acts subsequently to Step 513, and determines whether or not a current value of the operation means CN1 acting as the first adder-subtracter exceeds 11. Step 515 is a step that acts when the determination in Step 514 is YES (in excess of 11) or when the determination of the later-described Step 522 is YES (in excess of 11), and that generates a pulse output of the first error detection signal ER1. Step 516 is a step that acts subsequently to Step 515, and resets the fist flag having been set in Step 505. Step 517 is an operation end step that acts when the determination in Step 514 is NO (not more than 11), or subsequently to Step 516. Further, the operation start step 500 operates in cycle subsequently to Step 517.

Further, Step Block 519a consists of Step 515 and Step 516, and acts as the first initialization means.

Step 520 is a step that acts when the determination in Step 510 is NO (timer T1 is not Time's Up), or when the determination in Step 512a is NO, that is, the regular report is not permitted, and that determines whether or not a save time period of a residual leading data of the reply-waiting data table (see Block 203a of FIG. 9) having been written in a later-described Step 539 exceeds a predetermined reply response time period T. Step 521 is a step that acts when the determination in Step 520 is YES (timeout), and adds 6 counts to a value of the operation means CN1 acting as the first adder-subtracter. Step 522 is a step that acts subsequently to Step 521, and determines whether or not a current value of the operation means CN1 acting as the first adder-subtracter exceeds 11. Step 523 is a step that acts when the determination in Step 522 is NO (not more than 11), and sets a retransmission request flag. The program proceeds to the operation end step 517 subsequently to Step 523.

In addition, the reply-waiting data table 203a is formed of plural stages of shift register in which a stored data shifts every predetermined time period. In response to the fact that a reply-waiting command having been stored in the foregoing shift register shifts to an overflow register, a timeout determination by Step 520 is made.

Step 530 is a step that acts when the determination in Step 520 is NO (it is not timeout), and determines whether or not a readout request flag is set in Step 512b or later-described Steps 542 and 563b (see FIG. 12). Step 531 is step that acts when the determination in Step 530 is YES (readout request is present), and determines whether or not a retransmission request flag is set in Step 523 or the later-described Steps 542 and 551 (see FIG. 12). Step 532a is a step that acts when the determination in Step 531 is YES (retransmission request is present), and transmits the old readout request having been transmitted already with an irregular transmission packet 204a. Step 533a is a step that acts subsequently to Step 532a, and resets the retransmission request flag.

Step 532b is a step that acts when the determination in Step 531 is NO (retransmission request is absent), and transmits this time's readout request having been made in Step 530 with an irregular transmission packet 204a. Step 533b is a step that acts subsequently to Step 532b, and resets a readout request flag. Step 539 is a step that acts subsequently to Steps 533a and 533b or later-described Steps 538 and 537b, and sequentially stores command having been transmitted in Steps 532a and 532b or later-described Steps 537a and 537b in the reply-waiting data table 203a; and deletes the existing leading command by performing a shift operation of the data table, being a shift register. Then the program proceeds to the operation end Step 517 subsequently to Step 539.

Step 535 is a step that acts when the determination in Step 530 is NO (readout request is absent), and determines whether or not it is a time to carry out regular transmission with a regular transmission packet 201a. Step 536 is a step that acts when the determination in Step 535 is YES (it is the regular transmission time), and determines whether or not a retransmission request flag is set in Step 523 or later-described Steps 542 and 551 (see FIG. 12). Step 537a is a step that acts when the determination in Step 536 is YES (retransmission request is present), and transmits a regular transmission packet 201a based on the transmission command having been transmitted already. Step 538 is a step that acts subsequently to Step 537a, and resets a retransmission request flag.

Step 537b is a step that acts when the determination in Step 536 is NO (retransmission request is absent), and transmits this time's regular transmission packet 201a. When the determination in Step 535 is NO (it is not the regular transmission time), the program proceeds to the operation end step 517.

Further, with reference to FIG. 12, Step 540 is a step that acts when the determination of mentioned Step 508 (see FIG. 11) is YES (receiving flag operates), and carries out the sum check of a received data.

In addition, a frame of checksum obtained by the binary addition of individual digits of all frame data from a start data STX to an end data ETX, is added to each transmit-receive packet. Further, It is sum check that performs the binary addition of all frame data from a start data STX to a checksum data, and determines whether or not a result of this binary addition is a normal value OOH is sum check.

Step 541 is a step that acts subsequently to Step 540, and determines whether or not there is error as a result of sum check. Step 542 is a step that acts when the determination in Step 541 is YES (error is present), and sets a retransmission request flag or a readout request flag. Step 543 is a step that acts subsequently to Step 542, and deletes the received data in which error is present. Step 544 is a step that acts subsequently to Step 543, and adds 3 counts to a value of the operation means CN1 acting as the first adder-subtracter.

Additionally, when data having been received in Step 542 cannot be sorted out as a confirmation reply packet to regular transmission, a report reply packet responsive to an irregular transmission packet or a regular report packet, no retransmission request flag or readout request flag is set.

Step 545 is a step that acts subsequently to Step 544, and determines whether or not a current value of the operation means CN1 acting as the first adder-subtracter exceeds 11. Step 546 is a step that acts when the determination in Step 545 or the later-described Step 553 is YES (in excess of 11), and generates a pulse output of the first error detection signal ER1. Step 547 is a step that acts subsequently to Step 546, and resets the first flag having been set in Step 505 (see FIG. 11). Step 548 is a step that acts when the determination in Step 545 is NO (not more than 11), and performs the standby of a predetermined time period. The program proceeds to the operation end step 517 subsequently to Step 547, and then the operation start Step 500 operates in cycle.

Further, Step Block 519b consists of Step 546 and Step 547, and acts as the first initialization means.

Step 550 is a step that acts when the determination in Step 541 is NO (sum check error is absent), and determines whether or not the data having been received normally from the substation is data as to receiving failure (NACK) at the substation. Step 551 is a step that acts when the determination in Step 550 is YES (it is receiving failure), and sets a retransmission request flag. Step 552 is a step that acts subsequently to Step 551, and adds 3 counts to a value of the operation means CN1 acting as the first adder-subtracter. Step 553 is a step that acts subsequently to Step 552, and determines whether or not a current value of the operation means CN1 acting as the first adder-subtracter exceeds 11. When the determination in Step 553 is YES (in excess of 11), the program proceeds to Step 546.

Step 560 is a step that acts when the determination in Step 550 is NO (it is not receiving failure), and determines whether or not a received data is a regular report from the substation with a regular report packet. Step 561 is a step that acts when the determination in Step 560 is YES (regular report is received), and restarts a report interval timer T1. Step 562 is a step that acts subsequently to Step 561, and subtracts 1 count from a value of the operation means CN1 acting as the first adder-subtracter. Step 563*a* is a step that acts subsequently to Step 562, and determines whether or not a readout request flag is set in the data having been reported regularly. Step 563*b* is a step that acts when the determination in Step 563*a* is YES (readout request is present), and sets the readout request flag.

Step 563*c* is a step that acts when the determination in Step 563*a* is NO (readout request is absent) or subsequently to Step 563*b*, and that determines whether or not it is confirmation information such as a sum value with regard to the data memory (auxiliary RAM) 126*b* by checking an address of regular report having been received. Step 564*a* is a step that acts when the determination in Step 563*c* is YES, that is, it is confirmation information such as a sum value, and compares this confirmation information with reference information having preliminarily been calculated in Step 506. Step 564*b* is a step that acts when the determination in Step 564*a* YES, that is, the confirmation information and the reference information are in no coincidence as a result of comparison, and that performs the retransmission processing of a constant set data. The program goes to Step 552 subsequently to Step 564*b*.

Step 565 is a step that acts when the determination in Step 563*c* is NO, that is, it is a regular report regarding an indirect input data, and stores and saves a regular report data having been received. Step 566 is a step that acts when the determination in Step 553 is NO (not more than 11), when the determination in Step 548 or Step 564*a* is NO, i.e., it is not comparison error, or subsequently to Step 565 or the later-described Step 574, and inverts a logic level of a transmission-permitting control signal. The program proceeds to the operation end step 517 subsequently to Step 566.

In addition, the readout request flag in the mentioned Step 563*a* is the one that is set on the substation side in Step 608 of FIG. 13.

Step 570 is a step that acts when the determination in Step 560 is NO (it is not the receiving of regular report), and determines whether or not it is the receiving of confirmation reply. Step 571 is a step that acts when the determination in Step 570 is NO (it is not a confirmation reply with respect to regular transmission, but a report reply with respect to irregular transmission), and that stores an irregular readout data having been replied and reported from the substation in the RAM memory 116*b*. Step 572 is a step that acts subsequently to Step 571, and resets a readout request flag having been set in Step 512*b* (refer to FIG. 11) or Steps 542 and 563*b*. Step 573 is a step that acts when the determination in Step 570 is YES (confirmation reply of normal receiving with respect to the regular transmission) or subsequently to Step 572, and subtracts 1 count from a value of the operation means CN1 acting as the first adder-subtracter. Step 574 is a step that acts subsequently to Step 573, and erases a command, which is replied from the reply-waiting data table 203*b*, having been stored in the mentioned Step 539. The program proceeds to Step 566 subsequently to Step 574.

The operations heretofore are described in brief. With reference to FIGS. 11 and 12, Step Blocks 519*a* and 519*b* are first initialization means. Step 510 is first communication error determination means acting as receiving interval monitoring means of regular report. Step 515 is first error occurrence definition means for generating the first error detection signal ER1. Step 520 is first communication error determination means acting as reply delay monitoring means. Step Block 524 is a first adder-subtracter formed of Steps 513 and 521. Step 532*a* is retransmission means of an irregular transmission packet responsive to retransmission request. Step 532*b* is irregular transmission means responsive to readout request. Step 537*a* is retransmission means responsive to regular transmission. Step 537*b* is regular transmission means.

With reference to FIG. 12, Step 540 is first communication error determination means acting as bit information monitoring means. Step 546 is first error occurrence definition means for generating the first error detection signal ER1. Step 566 is transmission permitting control signal generation means. Step 575 is first adder-subtracter formed of Steps 544, 552, 562, and 573. Step Block 564 is storage constant confirmation processing means formed of Step 564 acting as comparison determination means and Step 564*b* acting as retransmission processing means.

Figure 14:
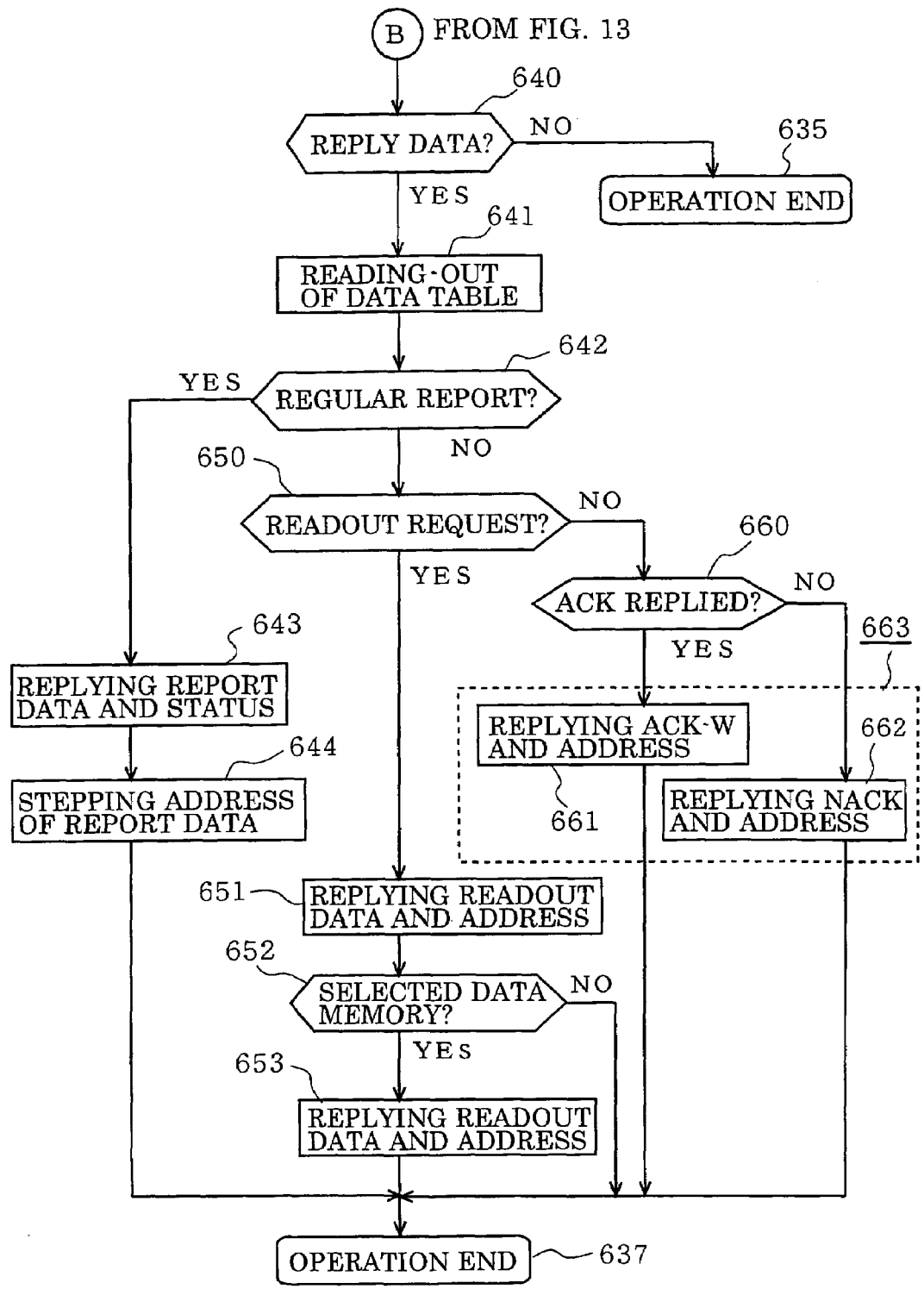
FIG. 14 is a flowchart for explaining receiving operation of the second control circuit section of the electronic control unit according to the second embodiment.

FIGS. 13 and 14 are flowcharts for explaining communication control operation in the second control circuit section 210*b* of the electronic control unit according to this second embodiment.

FIG. 13 shows mainly a control flow as to receiving operation of the auxiliary CPU 120*b* in the second control circuit section 210*b*. FIG. 14 shows mainly a control flow as to transmission operation of the auxiliary CPU 120*b* in the second control circuit section 210*b*.

With reference to FIG. 13, Step 600 is an operation start step of the auxiliary CPU 120*b* that is regularly activated. Step 600 is activated when the power supply switch 105*b* of FIG. 8 is turned on, and when a reset pulse signal RST2 is supplied; and operates in cycle subsequently to the later-described operation end step 635.

Step 601 is a step that acts subsequently to Step 600, and determines whether or not it is the first operation depending on whether or not the first flag is set in a later-described Step 605. Step 602 is a step that acts when the determination in Step 601 is YES (it is the first operation), and sets a current value of the second adder-subtracter 208*b* to an initial value "9". Step 603 is a step that acts subsequently to Step 602, and starts an interval timer T2 of which interval corresponds to an upper limit value of a regular transmission period. Step 604 is a step that acts subsequently to Step 603, and deletes content in the unprocessed data table 203*b* of FIG. 9. Step 605 is a step that acts subsequently to Step 604, and sets the first flag, not shown. The mentioned first flag is reset when the power supply switch 105*b* of FIG. 8 is turned on, and when a reset pulse signal RST2 is supplied to the auxiliary CPU 120*b*.

Step 606*a* is a step that acts when the determination in Step 601 is NO (it is not the first operation), or subsequently to Step 605, and that determines whether or not a regular transmission packet 211*a* of FIG. 10 is received, and regular report is permitted. Step 607*a* is a step that acts when the determination in Step 606*a* is YES (regular report is permitted), and determines whether or not it is a regular report time when a predetermined time period has passed since the last report. Step 607*b* is a step that acts when the determination in Step 607*a* is YES (regular report time has come), and that stores a regular report command in the unprocessed data table 203*b* of FIG. 9.

Step 607*c* is a step that acts when the determination in Step 606*a* is NO (regular report has not been permitted yet), when the determination in Step 607*a* is NO (regular report time has not come yet), or subsequently to Step 607*b*, and that determines whether or not an error is detected by, e.g., self-diagnosis of input/output performed by the auxiliary CPU 120*b*, and there is a request for this error to be urgently reported to the master station. Step 607*d* is a step that acts when the determination in Step 607*c* is YES (emergency report data is present), and writes data content such as error occurrence input/output number or error code number intended to be reported in a selected data memory of a specified address. Step 608 is a step that acts subsequently to Step 607*d*, and sets a readout request flag. Step 609 is a step that acts when the determination in Step 607*c* is NO (emergency report data is absent), or subsequently to Step 608, and determines whether or not a logic level of a transmission permitting control signal 207*a* is inverted, and a transmission permission to the master station is given.

In addition, when the determination in Step 609 is YES (change of a transmission permitting signal is present), the program proceeds to Step 640 of FIG. 14.

Step 610 is a step that acts when the determination in Step 609 is NO (transmission is not permitted), and determines whether or not a receiving flag is operated indicating the fact that the second series-parallel converter 127 receives a serial data having been transmitted from the first series-parallel converter 117, and that parallel conversion of the received data completes. When the determination in Step 610 is NO (not receiving), the program returns to Step 609.

Step 611 is a step tat acts when the determination in Step 610 is YES (receiving flag operates), and temporarily stores a series of received data having been received form the master station in a register D. Step 612 is a step that acts subsequently to Step 611, and determines whether or not the receiving interval monitoring timer T2 having been started in Step 603 or the later-described Steps 622*a* and 631 is Time's Up. Step 613 is a step that acts when the determination in Step 612 is NO (it is not Time's Up), and carries out the sum check of a series of received data having been received by Step 611. Step 614 is a step that acts subsequently to Step 613, and determines whether or not there is an error in the received data. Step 615 is a step that acts when the determination in Step 614 is NO (normal), and subtracts 1 count from a value of the operation means CN2 acting as the second adder-subtracter. Step 616 is a step that acts subsequently to Step 615, and determines whether a received data in Step 611 is an output setting made with a regular transmission packet 201*a* or a readout request made with an irregular transmission packet 204*a*.

Step 620 is a step that acts when the determination in Step 616 is a readout request, and temporarily stores a readout request command 30H and address provided by an irregular transmission packet 204*a* of FIG. 10. Step 621 is a step that acts when the determination in Step 616 is output setting, and temporarily stores an ACK·61H and address provided by a confirmation reply packet 201*c* of FIG. 10. Step 622*a* is a step that acts subsequently to Step 621, and stores an output set data or a constant set data having been obtained in Step 611 in a memory of a specified address, and restarts the receiving interval monitoring timer T2. Step 622*b* is a step that acts subsequently to Step 622*a*, and generates confirmation information, e.g., a binary addition value with regard to the whole of a constant set data, or a remainder value obtained by dividing this addition value by a predetermined constant.

Step 623 is a step that acts when the determination in Step 614 is YES (received data error), and adds 3 counts to a value of the operation means CN2 acting as the second adder-subtracter. Step 624 is a step that acts subsequently to Step 623, and determines whether or not a current value of the operation means CN2 acting as the second adder-subtracter exceeds 11. Step 625 is a step that acts when the determination in Step 624 is NO (not more than 11), and temporarily stores an NACK 82H and address. The program proceeds to the operation end step 635 subsequently to Steps 620, 622*b*, 625.

Step 626 is a step block formed of Steps 607*b*, 620, 621, 625. The foregoing Step Block 626 is a report reply command data to be stored in the unprocessed data table 203*b* of FIG. 9.

In addition, an NACK reply code responsive to readout request or output setting is not separated in Step 625. As shown in FIG. 10, however, it is also possible to separate this NACK reply code at 62H or 72H by noting a start data STX.

Step 630 is a step that acts when the determination in Step 612 is YES (receiving interval of a regular transmission data is too large), and adds 6 counts to a value of the operation means CN2 acting as the second adder-subtracter. Step 631 is a step that acts subsequently to Step 630, and restarts the receiving interval timer T2. Step 632 is a step that acts subsequently to Step 631, and determines whether or not a current value of the operation means CN2 acting as the second adder-subtracter exceeds 11. Step 633 is a step that acts when the determination in Step 632 is YES (in excess of 11), or when the determination in Step 624 is YES (in excess of 11), and that generates a pulse output of the second error detection signal ER2. Step 634 is a step that acts subsequently to Step 633, and resets the first flag having been set in Step 605. The program proceeds to the operation end step 637 when the determination in Step 632 is NO (not more than 11), or subsequently to Step 634.

Additionally, Step Block 635 consists of Step 615, Step 623 and Step 630, and acts as the second adder-subtracter.

Further, Step Block 636 consists of Step 633 and Step 634, and acts as the second initialization means.

Now, referring to FIG. 14, Step 640 is a step that acts when the determination of mentioned Step 609 (FIG. 13) is YES (transmission is permitted), and determines whether or not there is a report reply command having been stored in the unprocessed data table 203*b* in Step Block 626. Step 641 is a step that acts when the determination in Step 640 is YES (report reply command is present), and reads out a report reply command having been stored in the unprocessed data table 203*b* on the basis of first-in first-out. Step 642 is a step that acts subsequently to Step 641, and determines whether or not a report reply command having been read out in Step 641 is a regular report command having been stored in the mentioned Step 607*b*. Step 643 is a step that acts when the determination in Step 642 is YES (it is the regular report command), and transmits a regular report packet 206*a* of FIG. 10. Step 644 is a step that acts subsequently to Step 643, and advances an address of data to be regularly reported next time. The program proceeds to the operation end step 635 subsequently to Step 644.

Step 650 is a step that acts when the determination in Step 642 is NO (it is not the regular report command), and determines whether or not a report reply command having been read out in Step 641 is a readout request command having been stored in Step 620. Step 651 is a step that acts when the determination in Step 650 is YES (it is readout request), and reports and replies a readout data regarding a memory of a specified address together with the corresponding address.

Step 652 is a step that acts subsequently to Step 651, and determines whether or not an address of data having been reported and replied in Step 651 is the address of a selected data memory in which data has been written in Step 607*d*. Step 653 is a step that acts when the determination in Step 652 is YES (it is a selected data memory), and resets a readout request flag having been set in Step 608. When the determination in Step 652 is NO (it is not the selected data memory) or subsequently to Step 653, the program proceeds to the operation end step 637.

Step 660 is a step that acts when the determination in Step 650 is NO, that is, it is not readout request, or when it is receiving failure although it may be the readout request, and that determines whether a report reply data having been read out in Step 641 is either ACK-W (normal receiving with respect to the regular transmission) having been stored in Step 621, or NACK having been stored in Step 625. Step 661 is a step that acts when the determination in Step 660 is YES (ACK-W), and replies an acknowledged data ACK and the corresponding address. Step 662 is a step that acts when the determination in Step 660 is NO (NACK), and replies a non-acknowledged data NACK and the corresponding address. When the determination in Step 640 is NO (reply data is absent) or subsequently to Steps 661 and 662, the program proceeds to the operation end step 635.

In addition, Step Block 663 consists of Steps 661 and 662. The foregoing Step Block 663 corresponds to the transmission of confirmation reply packets 201*c*, 211*c*, 214*c* of FIG. 10. Step 651 corresponds to the transmission of a report reply packet 204*a* of FIG. 10. Step 643 corresponds to the transmission of a regular report packet 206*a* of FIG. 10.

The operations heretofore are described in brief. With reference to FIG. 13, Step Block 636 is second initialization means. Step 608 is readout request setting means by which the substation makes a readout request of a content of a selected data memory of a specified address with respect to the master station. Step 612 is second communication error determination means acting as receiving integral monitoring means of a regular transmission packet. Step 613 is second communication error determination means acting as bit information monitoring means with regard to the data having been transmitted from the master station. Step 633 is second error occurrence definition means for generating the second error detection signal ER2. Step Block 635 is second adder-subtracter formed of Steps 615, 623, 630.

Further, with reference to FIG. 14, Step 643 is regular report means for transmitting a regular report packet. Step 651 report reply means for transmitting a report reply packet responsive to readout request. Step Block 663 is confirmation reply means for transmitting a confirmation reply packet of normal receiving or receiving failure.

The action and operation are described in brief referring to FIGS. 8, 9, 10 on the basis of descriptions of the flowcharts in FIGS. 11 to 14.

With reference to FIG. 8, the main CPU 110*b* takes outputs from the first and second input sensor groups 102*a* an 102*b* and the first and second analog sensor groups 103*a* and 103*b* as input signals, and controls the first and second current consumer groups 104*a* and 104*b* based on a control program or the first constant set data, being a control constant that is stored in the non-volatile program memory 115*b*. However, the mentioned second input sensor group 102*b*, second analog sensor group 103*b* and second current consumer group 104*b* perform a serial communication indirectly with the main CPU 110*b* via the first and second series-parallel converters 117 and 127.

In addition, although an analog output is not utilized in the second embodiment shown in FIG. 8, it is also possible to mount a DA converter for a meter display as an indirect output, if necessary.

When the first error detection signal ER1 is generated in the first control circuit section 210*a*, the first flag is rest in Step 516 of FIG. 11 or in Step 547 of FIG. 12, and then the program proceeds to the operation end step 517. Therefore, when the program goes to the operation start step 500 again, initialization of the first control circuit section 210*a* itself is carried out in Steps 502-505.

On the other hand, a reset pulse signal is inputted to a reset input terminal RST2 of the second control circuit section 210*b* with the first error detection signal ER1, whereby the second control circuit section 210*b*, being the other side, is initialized and restarted as well.

Likewise, when the second error detection signal ER2 is generated in the second control circuit section 210*b*, the first flag is reset in Step 634 of FIG. 13, and then the program proceeds to the operation end step 635. Therefore, when the program goes to the operation start step 600 again, initialization of the second control circuit section 210*b* itself is carried out in Steps 602-604.

On the other hand, a reset pulse signal is inputted to a reset input terminal RST1 of the main CPU 110*b* in the first control circuit section 210*b* with the second error detection signal ER2, whereby the first control circuit section 210*a*, being the other side, is initialized and restarted as well.

The first and second control circuit sections 210*a* and 210*b* are initialized and restarted also with a reset pulse signal RST1 from the watchdog timer 130 or a reset pulse signal RST2 generated by run-away monitoring means that is provided in the main CPU 110*b*. However, upon generation of the first and second error detection signals ER1 and ER2 or the reset pulse signals RST1 and RST2, the error storage circuit 131*b* acting as error occurrence storage means counts and stores the generation of these signals to bring the alarm and display 108 in operation at the time of reaching a predetermined count value. Further, the foregoing count storage circuit 131*b* stops the operation of the load power supply relay 107*a* so that a power feed to a part of specified current consumers is stopped.

Accordingly, in the case where the main CPU 110*b* temporarily malfunctions due to noise malfunction, the main CPU is automatically restarted with a reset pulse RST1. However, the frequent occurrence of such malfunctions brings apart of current consumers in the state of drive stop through the load power supply relay 107*a*.

Nevertheless, when the power supply switch 105*b* is turned on again, error storage of the error storage circuit 131*b* is cleared, thereby enabling to recover to the normal operation state.

With reference to FIGS. 9 and 10, basic transmit-receive communication packets in this second embodiment is arranged of the output setting made by the regular transmission means 201*a* from the master station to the substation, and the input readout made by the regular report means 206*a* from the substation to the master station, in the same manner as in the first embodiment.

However, to prevent an erroneous output setting, a receiving confirmation packet is replied by the confirmation reply means 201*c* or 211*c* from the substation to the master station, with respect to the transmission from the master station to the substation.

Further, it is possible for the master station to read out data on the substation side with the readout request made by the irregular transmission means 204*a*. It is also possible for the substation side to work in a positive manner to read out information of a specified address with readout request by setting a readout request flag in regular report.

In addition, supposing that there is only a reciprocating communication in which the master station transmits and the substation replies to this transmission, the master station waits for a reply from the substation, and then makes the next transmission, thereby enabling to prevent the jam-up of communication.

However, supposing that the substation side intends to transmit regular report with respect to the master station without a command from the master station, the jam-up will occur in the upstream communication.

When occurring such jam-up, the unprocessed data table 203b makes a queue of un-replied information, and sequentially replies the information, thereby enabling to carry out the regular transmission or the regular report on a timely basis.

Furthermore, it is arranged such that regular report from the substation is inhibited at the start of operation when there are much data of downstream communication; and the main CPU 110b transmits the second constant set data, being an initial set data in a concentrated manner, and makes the readout request with an irregular transmission packet on a timely basis to be capable of reading out an indirect input information.

Features and advantages of the arrangement of the electronic control unit according to the second embodiment of the invention are described overall.

An electronic control unit 100b according to the second embodiment includes: a first control circuit section 210a that contains a program memory 115b including input/output control means with respect to an external device, a set data, being a controlling constant having preliminarily been set, and communication control means; an operation processing RAM memory 116b; a microprocessor (main CPU) 110b cooperating with the mentioned program memory 115b; and a first series-parallel converter 117; and a second control circuit section 210b that contains a communication control circuit section 120b for exchanging monitoring and control signals, a data memory (auxiliary RAM memory) 126b, and a second series-parallel converter 127; in which a serial communication of monitoring and control signals is carried out mutually between the first control circuit section 210a and the second control circuit section 210b via the first series-parallel converter 117 and the second series-parallel converter 127;

In the mentioned electronic control unit, the first control circuit section 210a includes regular transmission means 201a and storage constant confirmation processing means 206d, and the second control circuit section 210b includes regular report means 206a.

The regular transmission means 201a regularly transmits in sequence a control output data or a constant set data from the first control circuit section 210a to the second control circuit section 210b, and stores the control output data or constant set data having been received at the second control circuit section 210b in the data memory 126b. The regular report means 206a regularly reports confirmation information with regard to the whole or a part of constant set data that are stored in the data memory 126b from the second control circuit section 210b to the first control circuit section 210a. The storage constant confirmation processing means 206d compares reference information with regard to the whole or a part of the constant set data having preliminarily been set in the first control circuit section 210a with confirmation information given by the regular report means 206a, and retransmits a constant set data to the second control circuit section 210b with the regular transmission means 201a in the case of no coincidence as a result of comparison.

As a result, a constant set data to be transmitted to the data memory 126b of the second control circuit section 210b by the regular transmission means 201a from the first control circuit section 210a is individually subjected to error check at the time of being received at the second control circuit section 210b. Not only the retransmission processing of a constant set data having been abnormally received is carried out in case of receiving failure, but also the following processing are carried out after normal receiving. That is, confirmation information such as a sum value with respect to the entire constant set data is generated at the second control circuit section 210b, the foregoing confirmation information is regularly reported to the first control circuit section 210a, the mentioned confirmation information is compared with reference information such as a sum value with regard to the entire constant set data having preliminarily been calculated at the first control circuit section 210a, and the whole of constant set data is retransmitted in the case of no coincidence as a result of comparison. Consequently, even if the data memory 126b in the second control circuit section 210b is changed due to, e.g., influence of noise, it is possible to immediately detect this change and reset the data memory 126b with a correct data.

Further, in the electronic control unit 100b according to the second embodiment, the first control circuit section 210a includes regular report permitting means 211a for storing a command data that is transmitted by the regular transmission means 201a to a predetermined address of memory provided in the second control circuit section 210b, and that serves to permit the second control circuit section 210b to transmit the regular report; the regular report made by the regular report means 206a is not permitted, and the regular transmission means 201a transmits mainly a constant set data immediately after the start of operation of the microprocessor 110b; the regular report made by the regular report means 206a is permitted accompanied with the completion of transmitting a constant set data; and the regular transmission means 201a transmits mainly a control output data.

As a result, it is possible to diminish communication control load on the master station side, and to transmit a constant set data without delay by permitting no regular report when there are much downstream communication of various setting information from the first control circuit section acting as the master station to the second control circuit section acting as the substation at the start of operation.

In the electronic control unit 100b according to the second embodiment, the first control circuit section 210a further includes irregular transmission means 204a, and the second control circuit section 210b further includes report reply means 204c. The irregular transmission means 204a is readout request means that can be applied when communication error is present in a report made by the regular report means 206a; and that is applied as needed so that the first control circuit section 210a reads out and confirms a monitoring input data of a specified address with respect to the second control circuit section 210b, and reads out and checks a constant set data having been written and set by the regular transmission means 201a. The report reply means 204c is communication means by which report reply of a monitoring input data or a constant set data of a specified address is carried out as confirmation reply responsive to the fact that the second control circuit section 210b has received the mentioned irregular transmission data 204a; and the readout request is made again by retransmission request means 204e that is provided in the first control circuit section 210a in case of the presence of any communication error in this report reply.

As a result, even if the confirmation reply or retransmission processing to regular report is omitted, it is possible to make a confirmation with a readout request made by the irregular transmission means 204a, thus enabling to reduce a communication amount on a steady basis, and diminish a burden of communication control.

Further, it is possible to read out and check timely also a constant set data having been written and set by the regular transmission means 201a.

In the electronic control unit 100b according to the second embodiment, the first control circuit section 210a further includes transmission permitting control signal generation means 207a, and the second control circuit section 210b further includes an unprocessed data table 203b. The unprocessed data table 203b is a receiving side command memory having a first-in first-out structure arranged so as to sequentially save command data for performing regular report, confirmation reply, and report reply in order of generation, as well as to sequentially erase these save command data when data of regular report, confirmation reply, and report reply to the first control circuit section 210a are transmitted. The transmission permitting control signal generation means 207a is control signal delivery means from the first control circuit section 210a to the second control circuit section 210b. The second control circuit section 210b having received this signal starts transmitting the first-in leading command in the mentioned unprocessed data table 203b, as well as adds the latest confirmation information with regard to the latest monitoring input data or the mentioned constant set data to this leading command, and transmits the resulting command in the case where the leading command is regular report or report reply.

As a result, in the case where the generation of a transmission permitting control signal is delayed due to congestion situations of the first control circuit section 210a, or in the case where confirmation reply or report reply and regular report occur substantially at the same time, communication jam-up can be prevented by performing transmission standby with the unprocessed data table 203b, thereby enabling to further diminish the communication control load on the first control circuit section 210a.

Furthermore, it is possible to add the latest information at the moment of transmission of the regular report or the report reply to the first control circuit section 210a.

Further, in the electronic control unit 100b according to the second embodiment, the transmission permitting control signal generation means 207a generates a control signal in which logic level inverts alternately every time the first control circuit section 210a receives data of regular report, confirmation reply or report reply from the second control circuit section 210b.

As a result, the second control circuit section 210b makes the transmission to the first control circuit section 210a, and then monitors the presence or absence of the change in logic level of a transmission permitting control signal after a predetermined time period has passed, thereby enabling to detect a receiving state on the other side.

In the electronic control unit 100b according to the second embodiment, the mentioned first control circuit section 210a includes a reply-waiting data table 203a acting as a transmission-side command memory arranged so as to sequentially save a transmitted command, which the first control circuit section 210a has transmitted with regular transmission means 201a and irregular transmission means 204a to the second control circuit section 210b, as well as so as to sequentially erase this saved command when receiving a confirmation reply data or a report reply data from the second control circuit section 210b; and retransmission means 201e, 204e that acts when communication error is present in confirmation reply or report reply to the regular transmission means 201a or irregular transmission means 204a, or when a leading transmission command having been stored in the transmission-side command memory (that is, the reply-waiting data table 203a) is not erased even after a predetermined time period has passed, and that transmits again a transmission data based on the foregoing error transmission command. A transmission command having been transmitted again by the retransmission means 201e, 204e is deleted from and stored again in the transmission side command memory, and is subjected to the first-in first-out processing.

As a result, it is easy to determine whether or not there is any confirmation reply or report reply; and it is easy to define a command having to be retransmitted when communication error occurs.

In the electronic control unit 100b according to the second embodiment, the second control circuit section 210b includes readout request setting means 608 making a readout request of a selected data memory 205d of a specified address that is provided in the second control circuit section 210b by adding a readout request flag to status information contained in the regular report means 201a; and the first control circuit section 210a is arranged so that the irregular transmission means 204a acts when communication error is present in the regular report data or when the readout request is made from the readout request setting means 608, and is capable of making the readout request of a regular report content or a selected data memory.

As a result, the second control circuit section 210b not only performs a regular report, but also can work so that a content of the selected data memory 205d is immediately read out as the need arises, thereby enabling to immediately report error information other than communication error to the first control circuit section 210a while reducing a quantity of regular report data.

In the electronic control unit 100b according to the second embodiment, the first and second control circuit sections 210a and 210b further include first and second communication error determination means 201d, 204d, 206b, 201b, 204b, first and second adder-subtracters 208a and 208b, and first and second error occurrence definition means 209a and 209b respectively. The first communication error determination means 201d, 204d, 206b and the second communication error determination means 201b, 204b act as receiving error determination means for determining the presence or absence of error with regard to various regular and irregular communication packets, which the control circuit section on the side where these determination means are provided has received from the other control circuit section, or a state of being incapable of receiving a communication packet having to be received.

Further, the first and second adder-subtracters 208a and 208b act as operation means that adds or subtracts a second variation value when the receiving error determination means determines the presence of error, and subtracts or adds a first variation value when the receiving error determination means determines the absence of error to perform an addition-subtraction compensation with respect to a current value memory so as to mutually counteract; and that stops the addition-subtraction compensation with the first variation value at a predetermined normal-side limit value when no error determination continues. The first and second error occurrence definition means 209a and 209b act as comparison means for generating error detection signals when a current value of the adder-subtracters 208a and 208b come to be outside a region of a predetermined error-side limit value resulted from accumulation of the mentioned first and second variation values. The mentioned second variation value is set to be a value smaller than a permitted accumulation value, being a difference between the mentioned error-side limit value and normal-side limit value, and stopping the operation, or initialization and restart of the first or second control circuit section 210a, 210b is carried out responsive to the generation of the error detection signals.

As a result, a feature exists in that too sensitive error determination is not carried out with respect tot a sporadic and chronic error; and that the error determination is made responsive to the fact that a current value of the first adder-subtracter 208a comes to be outside the region of an error-side limit value, and the initialization and restart is carried out in the case where a communication error still occurs even if the retransmission processing continues. Consequently, it is possible to rationally regulate the permitted number of times of retransmission processing depending on a past history of whether or not a normal communication has continued.

In the electronic control unit 100b according to the second embodiment, storage constant confirmation processing means 206d, which the first control circuit section 210a includes, further includes reference information generation means 506, comparison determination means 564d, retransmission processing means 564b, and addition-subtraction processing means. The reference information generation means 506 is means for transferring a part or all of constant set data that is stored in the program memory 115b to the RAM memory 116b, and for calculating reference information, e.g., a binary addition value with regard to the whole of constant set data to be transmitted to a data memory (auxiliary RAM memory) 126b that is provided in the second control circuit section 210b out of constant set data having been transferred to the foregoing RAM memory 116b, or a remainder value obtained by dividing this binary addition value by a predetermined constant.

The comparison determination means 564a is means for performing a comparison of numerical values with confirmation information 205c, e.g., a binary addition value with regard to the whole of constant set data that is stored in the mentioned data memory 126b having been reported from the second control circuit section 210b by regular report means 206a, or a remainder value obtained by dividing this binary addition value by a predetermined constant, and for making an error determination. The retransmission means 564b is means for acting when the determination of the comparison determination means 564a is no coincidence as a result of comparison, and for transferring again a constant set data that is stored in the program memory 115b to the mentioned RAM memory 116b, as well as for transmitting again the constant set data having been transferred to this RAM memory 116b to the data memory 126b with the regular transmission means 201a. The addition-subtraction processing means is means for acting when the mentioned comparison determination means 564a determines no coincidence as a result of comparison, and for adding or subtracting a predetermined variation value with respect to the first adder-subtracter 208a to cause a current value of the first adder-subtracter 208a to approach to the error side.

As a result, even if the data memory 126a at the second control circuit section 210b is changed due to, e.g., influence of noise, it is possible to immediately detect the change, and reset the data memory 126a with a correct data. Likewise, even if the RAM memory 116a is changed due to, e.g., influence of noise, it is possible to immediately detect the change, and reset the RAM memory 116a with a correct data.

The first adder-subtracter 208a operates not only responding to the first communication error, but also responding to a comparison determination result of a confirmation information numerical value with regard to the entire content of the data memory 126b that is provided in the second control circuit section 210b. When errors as the result of the foregoing comparison determination or when any sporadic communication error has already occurred, it is possible for the first adder-subtracter 208a to generate the first error detection signal ER1 resulting in the performance of initialization and restart. After the normal communication has continued, it is possible for the first adder-subtracter 208a to prevent the initialization and restart for no reason responding to an error resulted from just one comparison determination.

In the electronic control unit 100b according to the second embodiment, the first and second control circuit sections 210a and 210b further include first and second initialization means 519a, 519b, 636 respectively. The first initialization means 519a, 519b is means for acting when the first error occurrence definition means 209a generates an error detection signal ER1, and for resetting a current value of the first adder-subtracter 208a to a predetermined initialization value at the start of operation, and for initializing and restarting a communication control circuit section (auxiliary CPU) 120b provided in the second control circuit section 210b. The second initialization means 636 is means for acting when the second error occurrence definition means 209b generates an error detection signal, and for resetting a current value of the second adder-subtracter 208b to a predetermined initialization value at the start of operation, as well as for initializing a microprocessor 110b provided in the first control circuit section 210a to restart or stop the operation thereof. An initialization value of the first and second adder-subtracters 208a, 208b to be reset by the first and second initialization means 519a, 519b, 636 is a value more close to the error-side limit value from the normal-side limit value.

As a result, it is possible to initialize a control circuit section on the other side without depending on a communication line where any error occurs. In addition, since a current value of the adder-subtracter is made closer to an error-side limit value at the time of restart, it is possible to achieve improvement in safety shortly after the start.

Further, in the electronic control unit 100b according to the second embodiment, the first and second communication error determination means 201d, 204d, 206b, 201b, 204b further include at least one of bit information monitoring means 540, 613 and reply delay monitoring means 520 or receiving interval monitoring means 510, 612. The bit information monitoring means 540, 613 is bit error determination means for determining the presence or absence of lack and mix of bit information such as parity check or sum check with respect to a serial data exchanged between the first and second control circuit sections 210a, 210b.

The reply delay monitoring means 520 is reply response error determination means for making the error determination at the first control circuit section 210a, being a source side when a reply data from the second control circuit section 210b with respect to a data, which the first control circuit section 210a has transmitted, cannot be received even if a predetermined reply response time period has passed. The receiving interval monitoring means 510, 612 are receiving interval error determination means for making the error determination when a receiving interval time period of the other-side control circuit section with respect to a regular transmission data, which the first control circuit section 210a transmits, or when a regular report data, which the second control circuit section 210b transmits, exceeds a predetermined value. The adder-subtracter performs an addition-subtraction compensation with a first variation value when none of the bit information monitoring means 540, 613, reply delay monitoring means 520, and receiving interval monitoring means 510, 612 makes the error determination.

As a result, a variety of determinations of communication error enable the improvement in detection accuracy and the early communication error detection; and a highly accurate error determination can be carried out due to the fact that definition of error occurrence is carried out with data collected at a pair of adder-subtracters.

In the electronic control unit 100b according to the second embodiment, the second variation value, which the adder-subtracter adds or subtracts when the determination of the bit information monitoring means 540, 613 is communication error, is set to be a value larger than the first variation value; and a variation value, which the adder-subtracter adds or subtracts when the determination of the reply delay monitoring means 520 or receiving interval monitoring means 510, 612 is communication error, is set to be a third variation value, being a value different from the mentioned second variation value. Furthermore, this third variation value is set to be a value smaller than a permitted accumulation value, being a difference between the mentioned error-side limit value and normal-side limit value.

As a result, it is possible to make the error determination with weighting a variety of determinations of communication error. Further, it is unnecessary to set any excessive float as to a threshold value for determining timeout error such as reply delay or receiving interval excess, and it is possible to set a determination time period in accordance with a raw power, thus enabling to carry out a highly accurate timeout determination.

Further, in the electronic control unit 100b according to the second embodiment, the first control circuit section 210a further includes a direct input/output signal interface circuit 112a, 114a, and either one of the first or second control circuit section 200a, 200b further includes a watchdog timer 130 and error occurrence storage means 131b. The direct input/output signal interface circuit 112a, 114a is bus-connected to the microprocessor 110b; this microprocessor is arranged so as to generate an output signal in response to a direct input signal having been inputted via the mentioned direct input signal interface circuit 112a, an indirect input signal having been received by a serial communication from a second series-parallel converter 127 provided in the mentioned second control circuit section 210b, and a content of the program memory 115b to drive a first current consumer group 104a that is connected to the mentioned direct output signal interface circuit 114a, and so as to transmit an indirect output signal to the second control circuit section 210b via the first and second series-parallel converters 117, 127.

Furthermore, the watchdog timer 130 is a run-away monitoring timer circuit that monitors a watchdog clear signal WD1, being a pulse train, which the microprocessor 110b generates, and that generates a reset pulse signal RST1 when a pulse width of this watchdog clear signal WD1 exceeds a predetermined value. The error occurrence storage means 131b is an error storage circuit that stores the first and second error detection signals ER1 and ER2 or a reset pulse signal RST1 eventually to bring annunciation means 108 such as alarm, display, printing, and history save in operation when these first and second error detection signals are generated, and when this reset pulse signal RST1 is generated by the watchdog timer 130. The microprocessor 110a is initialized and restarted when the watchdog timer 130 generates a reset pulse signal RST1 and when the second error detection signal ER2 is generated; and a communication control circuit section 120b of the second control circuit section 210b is initialized and restarted when the watchdog timer 130 generates a reset pulse signal RST1 and when the first error detection signal ER1 is generated.

As a result, it is possible to restart the microprocessor 110 without depending on a communication line where any error occurs. Furthermore, the error detection signal as to communication is generated with plural times of communication errors, while the error storage or restart is carried out immediately in response to the occurrence of a watchdog timer error, thus enabling to announce errors with the weighting with respect to error processing being changed.

Further, even in the case where the microprocessor 110b is normally restarted at once due to temporary noise malfunction, the fact that error has occurred come to be apparent, thereby enabling to induce maintenance inspection.

In the electronic control unit 100b according to the second embodiment, the second control circuit section 210b further includes an auxiliary CPU 120b acting as the mentioned communication control circuit section, and the first control circuit section 210a further includes run-away monitoring means with respect to this auxiliary CPU 120b. The auxiliary CPU 120b is a microprocessor that is contained in the mentioned second control circuit section 210b along with an auxiliary program memory 125 cooperating with this auxiliary CPU 120b, an auxiliary RAM memory 126b for operation processing, an indirect input/output signal interface circuit 122b, 124b and a second series-parallel converter 127, that transmits an indirect input signal associated with a signal having been inputted via the indirect input signal interface circuit 122b to the first control circuit section 210a via the first and second series-parallel converters 117 and 127, and that drives a second current consumer group 104b connected to the mentioned indirect output signal interface circuit 124b with an output associated with an indirect output signal having been received from the first control circuit section 210a via the first and second series-parallel converters 117 and 127.

The run-away monitoring means is means for monitoring a watchdog clear signal ED2, being a pulse train, which the auxiliary CPU 120b generates, with a microprocessor 110b acting as a main CPU that is provided in the first control circuit section 210a, and for generating a reset pulse signal RST2 when a pulse width of this watchdog clear signal WD2 exceeds a predetermined value. When the run-away monitoring means generates a reset pulse signal RST2, when the watchdog timer 130 generates a reset pulse signal RST1 and when the first error detection signal ER1 is generated, the auxiliary CPU 120b is initialized and restarted, and an error storage circuit 131b counts and stores the error occurrence.

As a result, it is possible to restart the auxiliary CPU 120b without depending on a communication line where any error occurs; and it is possible to change the weighting of error processing with respect to the occurrence of communication error and the occurrence of run-away error that is determined by run-way monitoring means.

Further, even in the case where the auxiliary CPU 120b is normally restarted at once due to temporary noise malfunction, the fact that error has occurred comes to be determined, thereby enabling to induce maintenance inspection.

In the electronic control unit 100b according to the second embodiment, the error occurrence storage means 131b is formed of a count storage circuit; and this count storage circuit counts an OR output with respect to the first and second error detection signals and reset pulse signals RST1 and RST2 generated by the watchdog timer 130 or the run-away monitoring means, and brings the annunciation means 108 in operation when this count value reaches a predetermined value.

As a result, it is possible to set a determination threshold value of the watchdog timer 130 or run-away monitoring means at a strict value matching a raw power period of watchdog clear signals WD1 and WD2, and to make an accurate run-away determination; and further it is possible to prevent the error alarm from being made without reason.

Furthermore, since the OR means 141b is provided, communication errors attributed to run-away error are not counted redundantly.

Now the other embodiments (that is, modifications of Embodiments 1 and 2) are hereinafter described.

In the aforementioned electronic control unit according to the foregoing first embodiment or the second embodiment, the adder-subtracter is provided for subtracting the first variation value at the time of normal communication, and for adding the second variation value, being a value larger than the mentioned first variation value, at the time of the occurrence of any communication error; and the error occurrence is defined when a current value of the foregoing adder-subtracter exceeds a predetermined threshold. By setting the mentioned second variation value to be a value smaller than the mentioned threshold, it is possible to avoid too sensitive error determination in the case of a sporadic and chronic error in which an abnormal state automatically recovers; while to carry out a retransmission processing in accordance with a history state of the past in the case of a fatal and continuous failure, and then immediately define the error determination.

However, as for the way of arrangement of the adder-subtracter, it is preferable that, for example, the lower limit value is set to "−9", an initial value "0", and the upper limit value "3"; and a current value of the adder-subtracter decreases to "−9" in the case where the normal communication continues, the addition to a current value is carried out in case of the presence of communication error, and the error occurrence is defined when this current value exceeds the upper limit value "3".

It is also preferable that direction of the addition and subtraction is inverted, for example, a normal-side upper limit value is set to "11", an initial value "3", and an error determination lower limit value "0"; and a current value of the adder-subtracter increases to "11" in the case where the normal communication continues, the subtraction from a current value is carried out in case of the presence of communication error, and the error occurrence is defined when this current value comes to be less than the lower limit value "0".

Further, in the aforementioned electronic control units according to the foregoing first embodiment and the second embodiment, it is arranged such that with respect to various communication errors such as sum check error, timeout error or others due to reply delay or receiving interval error, the adder-subtracter counts current dangerous states overall, and the possible number of times of retransmission processing is also determined in a unitary manner based on a quantity of allowance up to an error determination threshold value.

However, the weighting of variation values to compensate a current value of the adder-subtracter with respect to various communication errors such as sum check error, timeout error or others due to reply delay or receiving interval error is to be determined experimentally and statistically in accordance with a practical target, and determined in accordance with an intended degree of safety.

Accordingly, it is desirable that data of a apart or all of various control constants such as first variation value, second variation value, third variation value, normal-side limit value, error-side limit value, initial value or others to be processed at the mentioned first and second adder-subtracters, or data of a apart or all of various control constants such as permitted value of a reply response time period or receiving interval time period to be used at the mentioned first communication error determination means, can be transferred and written from the non-volatile program memory cooperating with the main CPU, and the setting change of these constants can be conducted when required.

Furthermore, in the aforementioned electronic control units according to the foregoing first embodiment and the second embodiment, both first and second control circuit sections are described as those that include control input and control output that are externally connected. For example, however, it is preferable that the second control circuit section is not provided with any external input/output, and intends to perform monitoring control with respect to the first control circuit section.

In this case, it is preferable that monitoring target information is transmitted from the first control circuit section to the second control circuit section, and analysis filed information is replied from the second control circuit section to the first control circuit section; and that in case of the presence of error in the monitoring result, this monitoring result error is algebraically added to the adder-subtracter for use in the mentioned communication error determination as a compensation variation value.

Further, the indirect input signal, which the second control circuit section transmits to the first control circuit section, is not always a signal that transmits an ON/OFF state of the second input sensor group connected to the second control circuit section as it is. It is possible that this indirect input signal is subjected to some logical connection processing at the second control circuit section, and thereafter that the resulting signal is transmitted as an indirect input signal.

Likewise, the indirect output signal, which the first control circuit section transmits to the second control circuit section, is not always a signal that drives the second current consumer group connected to the second control circuit section as it is. It is possible for this indirect output signal to be subjected to some logical connection processing at the second control circuit section, and thereafter to drive the second current consumer group.

Further, in the aforementioned electronic control units according to the foregoing first embodiment and the second embodiment, the microprocessor is arranged to be automatically restarted at the time of error occurrence so as to continue the operation of devices as long as possible. It is, however, possible to change the arrangement so that the microprocessor is stopped at the time of error occurrence, and can be restarted only upon application of any manual operation.

Finally, it is possible that an error occurrence time is saved and an external tool is connected to read out and display history information as annunciation means at the time of error occurrence.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An electronic control unit comprising:
a first control circuit section that contains a program memory including input/output control means with respect to any external apparatus, a set data being a preliminarily set controlling constant, and communication control means; an operation processing RAM memory; a microprocessor cooperating with said program memory; and a first series-parallel converter;
a second control circuit section that contains a communication control circuit section for exchanging monitoring and control signals, a data memory, and a second series-parallel converter;
in which a serial communication of monitoring and controlling signals is carried out mutually between said first control circuit section and the second control circuit section via said first and second series-parallel converters;
wherein said first control circuit section includes regular transmission means and storage constant confirmation processing means, and said second control circuit section includes regular report means;
said regular transmission means regularly transmits in sequence a control output data or a constant set data from said first control circuit section to said second control circuit section, and stores said control output data or constant set data having been received at said second control circuit section in said data memory;
said regular report means regularly reports confirmation information with regard to the whole or a part of constant set data that are stored in said data memory, from said second control circuit section to said first control circuit section; and
said storage constant confirmation processing means compares reference information with regard to the whole or a part of said constant set data having preliminarily been set in said first control circuit section with confirmation information given by said regular report means, and retransmits a constant set data to said second control circuit section by said regular transmission means in the case of no coincidence as a result of comparison.

2. The electronic control unit according to claim 1, wherein said first control circuit section comprises regular report permitting means for storing a command data that is transmitted by said regular transmission means to a predetermined address of memory provided in said second control circuit section, and that serves to permit said second control circuit section to transmit said regular report; and
the regular report made by said regular report means is not permitted and said regular transmission means transmits mainly a constant set data immediately after the start of operation of said microprocessor; the regular report made by said regular report means is permitted accompanied with the completion of transmitting a constant set data; and said regular transmission means transmits mainly a control output data.

3. The electronic control unit according to claim 1, wherein said first control circuit section comprises irregular transmission means, and said second control circuit section comprises report reply means;
said irregular transmission means is readout request means that can be applied when any communication error is present in the report made by said regular report means; and that is applied as needed so that said first control circuit section reads out and confirms a monitoring input data of a specified address with respect to said second control circuit section, and reads out and checks a constant set data having been written and set by said regular transmission means; and
said report reply means is communication means by which a report reply of a monitoring input data or a constant set data of a specified address is carried out as confirmation reply responsive to the fact that said second control circuit section has received said irregular transmission data; and the readout request is made again by retransmission request means that is provided in the first control circuit section in case of the presence of communication error in said report reply.

4. The electronic control unit according to claim 3, wherein said first control circuit section comprises transmission permitting control signal generation means, and said second control circuit section comprises an unprocessed data table;
said unprocessed data table is a receiving side command memory having a first-in first-out structure arranged so as to sequentially save command data for performing said regular report, confirmation reply and report reply in order of generation, and to sequentially erase said save command data when data of regular report, confirmation reply and report reply to the first control circuit section are transmitted; and
said transmission permitting control signal generation means is control signal delivery means from said first control circuit section to said second control circuit section; and said second control circuit section having received a signal that is sent from said control signal delivery means starts transmitting the first-in leading command in said unprocessed data table, and adds the latest confirmation information with regard to the latest monitoring input data or said constant set data to said leading command, and transmits the resulting command in the case where said leading command is regular report or report reply.

5. The electronic control unit according to claim 4, wherein said transmission permitting control signal generation means generates a control signal of which logic level inverts alternately every time said first control circuit section receives data of regular report, confirmation reply, or report reply from said second control circuit section.

6. The electronic control unit according to claim 4, wherein said first control circuit section comprises a reply-waiting data table acting as a transmission-side command memory arranged so as to sequentially save a transmitted command, which said first control circuit section has transmitted with regular transmission means and irregular transmission means to said second control circuit section, and so as to sequentially erase said saved command when receiving a confirmation reply data or a report reply data from the second control circuit section; and retransmission means that acts when communication error is present in confirmation reply or report reply to said regular transmission means or irregular transmission means, or when a leading transmission command having been stored in said transmission-side command memory is not erased even after a predetermined time period has passed, and that transmits again a transmission data based on said error transmission command; and
a transmission command having been transmitted again by said retransmission means is deleted from and stored again in said transmission side command memory, and is subjected to the first-in first-out processing.

7. The electronic control unit according to claim 4, wherein said second control circuit section comprises readout request setting means making a readout request of a selected data memory of a specified address that is provided in said second control circuit section by adding a readout request flag to status information contained in said regular report means; and said first control circuit section is arranged so that said irregular transmission means acts when communication error is present in said regular report data or when a readout request is made from said readout request setting means, and is capable of making a readout request of a regular report content or a selected data memory.

8. The electronic control unit according to claim 4, wherein said first and second control circuit sections comprise first and second communication error determination means, first and second adder-subtracters, and first and second error occurrence definition means respectively;

said first and second communication error determination means act as receiving error determination means for determining the presence or absence of error with regard to various regular and irregular communication packets, which the control circuit section on the side where said determination means is provided as received from the other control circuit section, or a state f being incapable of receiving a communication packet having to be received;

said first and second adder-subtracters act as operation means that adds or subtracts a second variation value when said receiving error determination means determines the presence of error, and subtracts or adds a first variation value when the receiving error determination means determines the absence of error to perform an addition-subtraction compensation with respect to a current value memory so as to mutually counteract; and that stops the addition-subtraction compensation with said first variation value at a predetermined normal-side limit value when no error determination continues;

said first and second error occurrence definition means act as comparison means for generating an error detection signal when a current value of said adder-subtracter comes to be outside a region of a predetermined error-side limit value resulted from accumulation of said first and second variation values; and said second variation value is set to be a value smaller than a permitted accumulation value, being a difference between said error-side limit value and normal-side limit value; and stopping the operation, or initialization and restart of said first or second control circuit section is carried out responsive to the generation of said error detection signal.

9. The electronic control unit according to claim 8, wherein said storage constant confirmation processing means, which said first control circuit section includes, comprises reference information generation means, comparison determination means, retransmission processing means, and addition-subtraction processing means;

said reference information generation means is means for transferring a part or all of constant set data that is stored in said program memory to said RAM memory, and for calculating reference information, e.g., a binary addition value with regard to the whole of constant set data to be transmitted to a data memory that is provided in said second control circuit section among constant set data having been transferred to said RAM memory, or a remainder value obtained by dividing said binary addition value by a predetermined constant;

said comparison determination means is means for performing a comparison of numerical values with confirmation information, e.g., a binary addition value with regard to the whole of constant set data that is stored in said data memory having been reported from the second control circuit section by regular report means, or a remainder value obtained by dividing said binary addition value by a predetermined constant, and for making an error determination;

said retransmission means is means for acting when the determination of said comparison determination means is no coincidence as a result, and for transferring again a constant set data that is stored in said program memory to said RAM memory, as well as for transmitting again the constant set data having been transferred to said RAM memory to said data memory with said regular transmission means; and said addition-subtraction processing means is means for acting when said comparison determination means determines no coincidence as a result of comparison, and for adding or subtracting a predetermined variation value with respect to aid first adder-subtracter to cause a current value of the first adder-subtracter to approach to the error side.

10. The electronic control unit according to claim 8, wherein said first and second control circuit sections comprise first and second initialization means respectively;

said first initialization means is means for acting when said first error occurrence definition means generates an error detection signal, for resetting a current value of said first adder-subtracter to a predetermined initialization value at the start of operation, and for initializing and restarting a communication control circuit section provided in said second control circuit section;

said second initialization means is means for acting when said second error occurrence definition means generates an error detection signal, for resetting a current value of said second adder-subtracter to a predetermined initialization value at the start of operation, and for initializing a microprocessor provided in said first control circuit section to restart or stop the operation of it; and an initialization value of the first and second adder-subtracters to be reset by said first and second initialization means is a value more close to said error-side limit value from said normal-side limit value.

11. The electronic control unit according to claim 8, wherein said first and second communication error determination means comprise at least one of bit information monitoring means and reply delay monitoring means or receiving interval monitoring means;

said bit information monitoring means is bit error determination means for determining the presence or absence of lack and mix of bit information such as parity check or sum check with respect to a serial data exchanged between said first and second control circuit sections;

said reply delay monitoring means is reply response error determination means for making the error determination at the first control circuit section, being a source side when a reply data from said second control circuit section with respect to a data, which said first control circuit section has transmitted, cannot be received even if a predetermined reply response time period has passed;

said receiving interval monitoring means is receiving interval error determination means for making the error determination when a receiving interval time period of the other-side control circuit section with respect to a regular transmission data, which said first control circuit section transmits, or a regular report data, which said second control circuit section transmits, exceeds a predetermined value; and said first and second adder-subtracters perform an addition-subtraction compensation with a first variation value when none of said bit information monitoring means, reply delay monitoring means and receiving interval monitoring means makes the error determination.

12. The electronic control unit according to claim 11, wherein said second variation value, which said adder-subtracter adds or subtracts when the determination of said bit information monitoring means is communication error, is set to be a value larger than said first variation value; and a variation value, which said adder-subtracter adds or subtracts when the determination of said reply delay monitoring means or receiving interval monitoring means is communication error, is set to be a third variation value, being a value different from said second variation value; and, furthermore, said third variation value is set to be a value smaller than a permitted accumulation value, being a difference between said error-side limit value and normal-side limit value.

13. The electronic control unit according to claim 4, wherein said first control circuit section comprises a direct input/output signal interface circuit, and either one of said first or second control circuit section comprises a watchdog timer and error occurrence storage means;

said direct input/output signal interface circuit is bus-connected to said microprocessor; said microprocessor is arranged so as to generate an output signal in response to a direct input signal having been inputted via said direct input signal interface circuit, an indirect input signal having been received by a serial communication from a second series-parallel converter provided in said second control circuit section and a content of said program memory to drive a first current consumer group that is connected to said direct output signal interface circuit, and to transmit an indirect output signal to the second control circuit section via said first and second series-parallel converters;

said watchdog timer is a run-away monitoring timer circuit that monitors a watchdog clear signal, being a pulse train, which said microprocessor generates, and that generates a reset pulse signal when a pulse width of said watchdog clear signal exceeds a predetermined value;

said error occurrence storage means is an error storage circuit that stores said first and second error detection signals or a reset pulse signal to bring annunciation means such as alarm, display, printing, or history save in operation when said first and second error detection signals are generated, and when a reset pulse signal is generated by said watchdog timer; and said microprocessor is initialized and restarted when said watchdog timer generates a reset pulse signal and when said second error detection signal is generated, and a communication control circuit section of said second control circuit section is initialized and restarted when said watchdog timer generates a reset pulse signal and when said first error detection signal is generated.

14. The electronic control unit according to claim 13, wherein said second control circuit section comprises an auxiliary CPU acting as said communication control circuit section, and said first control circuit section comprises run-away monitoring means with respect to said auxiliary CPU;

said auxiliary CPU is a microprocessor that is contained in said second control circuit section along with an auxiliary program memory cooperating with said auxiliary CPU, an auxiliary RAM memory for operation processing, an indirect input/output signal interface circuit and a second series-parallel converter, that transmits to the first control circuit section via said first and second series-parallel converters an indirect input signal associated with a signal having been inputted via said indirect input signal interface circuit, and that drives a second current consumer group that are connected to said indirect output signal interface circuit with an output associated with an indirect output signal having been received from said first control circuit section via said first and second series-parallel converters;

said run-away monitoring means is means for monitoring a watchdog clear signal, being a pulse train, which said auxiliary CPU generates, with a microprocessor acting as a main CPU that is provided in said first control circuit section, and for generating a reset pulse signal when a pulse width of said watchdog clear signal exceeds a predetermined value; and when said run-away monitoring means generates a reset pulse signal, when said watchdog timer generates a reset pulse signal and when said first error detection signal is generated, said auxiliary CPU is initialized and restarted, and said error occurrence storage means stores the occurrence of error.

15. The electronic control unit according to claim 13, wherein said error occurrence storage means is formed of count storage circuit; and said count storage circuit counts an OR output with respect to said first and second error detection signals and a reset pulse signal generated by the watchdog timer or the run-away monitoring means, and brings said annunciation means in operation when said count value reaches a predetermined value.

* * * * *